United States Patent
Ueda et al.

(10) Patent No.: US 9,535,426 B2
(45) Date of Patent: Jan. 3, 2017

(54) POSITIONING CONTROL DEVICE

(71) Applicant: Mitsubishi Electric Corporation, Tokyo (JP)

(72) Inventors: Koichiro Ueda, Tokyo (JP); Yoshihiro Marushita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/781,348

(22) PCT Filed: Jun. 26, 2014

(86) PCT No.: PCT/JP2014/067021
§ 371 (c)(1),
(2) Date: Sep. 30, 2015

(87) PCT Pub. No.: WO2015/198455
PCT Pub. Date: Dec. 30, 2015

(65) Prior Publication Data
US 2016/0306369 A1 Oct. 20, 2016

(51) Int. Cl.
*H02P 3/14* (2006.01)
*G05D 13/66* (2006.01)
(Continued)

(52) U.S. Cl.
CPC .............. *G05D 13/66* (2013.01); *G05B 11/01* (2013.01); *G05D 3/20* (2013.01); *G05B 2219/30* (2013.01)

(58) Field of Classification Search
CPC .. H02M 5/4585; H02M 5/458; H02M 7/5387; H02P 3/14; H02P 23/06; H02P 3/18; H02P 23/07; H02P 27/00; H02P 6/34; H02P 2201/03; H02P 2201/07; H02P 23/20; H02P 27/06; H02P 6/085; H02P 6/28
(Continued)

(56) References Cited

U.S. PATENT DOCUMENTS 5,839,800 A * 11/1998 Koga .................. B60K 6/46
188/156
6,333,611 B1 * 12/2001 Shibuya .............. B29C 45/7666
318/370
(Continued)

FOREIGN PATENT DOCUMENTS

JP 5-325446 A 12/1993
JP 2000-236679 A 8/2000
(Continued)

OTHER PUBLICATIONS

International Search Report for PCT/JP2014/067021 dated Sep. 2, 2014.

*Primary Examiner* — Paul Ip
(74) *Attorney, Agent, or Firm* — Sughrue Mion, PLLC; Richard C. Turner

(57) ABSTRACT

A positioning control device according to an embodiment includes an amplifier that includes a converter that rectifies and outputs an AC power supply to bus-bars; a smoothing capacitor that smoothes an output of the converter and generates a bus voltage; a regenerative resistance and a regenerative transistor; an inverter that supplies a drive current; and a command generation unit that generates a position command value for positioning control of a mechanical load in accordance with a command pattern. The inverter is connected between the bus-bars and supplies the drive current. The command generation unit acquires a regenerative-power-amount estimated value and an energy value storable in the smoothing capacitor; and on the basis (Continued)

of a result of a comparison between these values, it decides whether to use the position command value on the basis of the command pattern.

10 Claims, 17 Drawing Sheets

(51) Int. Cl.
*G05D 3/20* (2006.01)
*G05B 11/01* (2006.01)

(58) Field of Classification Search
USPC ............... 318/370, 371, 372, 376, 566, 671
See application file for complete search history.

(56) References Cited

U.S. PATENT DOCUMENTS

| | | | | |
|---|---|---|---|---|
| 7,042,178 B2* | 5/2006 | Yamada | .................. | H02P 23/07 318/34 |
| 7,227,323 B2* | 6/2007 | Yamada | ................ | H02M 5/458 187/290 |
| 7,627,387 B2* | 12/2009 | Ueda | .................... | G05B 19/416 700/63 |
| 7,778,716 B2* | 8/2010 | Ueda | .................... | G05B 19/416 700/280 |
| 8,049,442 B2* | 11/2011 | Lee | .................... | B29C 45/7666 318/139 |
| 8,080,953 B2* | 12/2011 | Takeuchi | .................. | H02P 6/34 318/376 |
| 2004/0227480 A1* | 11/2004 | Kato | ........................ | H02P 3/14 318/376 |
| 2004/0245951 A1* | 12/2004 | Yamada | .................. | H02P 23/07 318/376 |
| 2004/0245952 A1* | 12/2004 | Yamada | ................ | H02M 5/458 318/377 |
| 2005/0007049 A1* | 1/2005 | Kim | ........................ | B60L 1/02 318/376 |
| 2006/0033466 A1* | 2/2006 | Yamada | .................. | H02P 23/06 318/800 |
| 2006/0229745 A1* | 10/2006 | Ueda | .................... | G05B 19/416 700/63 |
| 2009/0039809 A1* | 2/2009 | Takeuchi | .................. | H02P 6/34 318/400.09 |
| 2009/0058333 A1* | 3/2009 | Okada | .................... | B66B 1/308 318/380 |
| 2009/0177296 A1* | 7/2009 | Ueda | .................... | G05B 19/416 700/63 |
| 2009/0218976 A1* | 9/2009 | Iwashita | ............. | H02M 5/4585 318/441 |
| 2010/0252691 A1* | 10/2010 | Malkin | .................... | B64C 13/28 244/76 R |
| 2011/0247900 A1* | 10/2011 | Blasko | ...................... | B66B 1/30 187/247 |
| 2011/0313608 A1* | 12/2011 | Izumi | ........................ | B60L 1/20 701/22 |
| 2012/0068636 A1* | 3/2012 | Iwashita | ............. | H02M 5/4585 318/376 |
| 2012/0068637 A1* | 3/2012 | Iwashita | ................ | H02P 23/20 318/376 |
| 2013/0009576 A1 | 1/2013 | Iwashita et al. | | |
| 2013/0300337 A1* | 11/2013 | Nagaoka | ............ | G05B 19/416 318/671 |

FOREIGN PATENT DOCUMENTS

| | | |
|---|---|---|
| JP | 2006-54947 A | 2/2006 |
| JP | 2006-238520 A | 9/2006 |
| JP | 2006-321640 A | 11/2006 |
| JP | 2013-17305 A | 1/2013 |
| WO | 2010/041314 A1 | 4/2010 |
| WO | 2012/093545 A1 | 7/2012 |

* cited by examiner

POSITIONING CONTROL DEVICE

CROSS REFERENCE TO RELATED APPLICATIONS

This application is a National Stage of International Application No. PCT/JP2014/067021 filed Jun. 26, 2014, the contents of which are incorporated herein by reference in their entirety.

FIELD

The present invention relates to a positioning control device.

BACKGROUND

A servo motor and other motors have been used as a driving source for a positioning control of various industrial machines such as a conveyor machine, a semiconductor manufacturing device, an electronic-parts mounting device, and a robot. In order to reduce the running costs of an industrial machine, it is necessary to decrease the power consumption amount when the motor performs a positioning operation, that is, the integral power consumption.

In order to reduce the power consumption amount, it is a possible method to use devices such as a high-efficiency motor and a power-supply regenerative converter. However, there is a problem in that these devices are expensive. When the power consumption amount can be reduced by adjusting a positioning-control command value, then a reduction in power consumption amount can be achieved at low costs without introducing any additional device.

A technique has been disclosed, in which a positioning-control command value with a shorter positioning time and a greater power consumption amount, and a positioning-control command value with a longer positioning time and a less power consumption amount, are stored, and a user can select either of them (see, for example, Patent Literature 1).

CITATION LIST

Patent Literature

Patent Literature 1: Japanese Patent Application Laid-open No. H5-325446

SUMMARY

Technical Problem

A positioning operation involves an accelerating operation and a decelerating operation in order to move a mechanical load from one position to another position. When performing an accelerating operation, a motor consumes power. In contrast, upon performing a decelerating operation, a motor enters a power-generating state, and generally regenerative power is produced. For example, a motor-driving device for driving a motor, such as a servo amplifier, often includes a regenerative resistance and a regenerative transistor. In the configuration as described above, when regenerative power is produced, a part of the regenerative power is consumed by the regenerative resistance. However, not all of the produced regenerative power is consumed by the regenerative resistance. A part of the regenerative power remains in the motor-driving device and is used for the next positioning operation. This regenerative power is an important factor in terms of the power consumption when the motor is running. However, the conventional technique does not take this regenerative power into account, and therefore there is a problem in that the reduction in power consumption is insufficient.

The present invention has been achieved to solve the above problems, and an objective of the present invention is to provide a positioning control device that reduces the power consumption during positioning operations.

Solution to Problem

In order to solve the problem and achieve the objective mentioned above, the present invention relates to a positioning control device that includes an amplifier that includes a converter to rectify and to output an AC power supply to bus-bars, a smoothing capacitor to smooth an output of the converter and to generate a bus voltage, a regenerative resistance and a regenerative transistor that are connected between the bus-bars, and an inverter to supply a drive current for driving a motor; and a command generation unit to generate a position command value for a positioning control of a mechanical load connected to the motor, the position command value being generated on the basis of a command pattern that is pattern information of a command velocity and command acceleration. The inverter is connected between the bus-bars, and supplies the drive current on the basis of the position command value, and the command generation unit acquires a regenerative-power-amount estimated value that is estimated from the command pattern before a start of a positioning operation and acquires an energy value that is storable in the smoothing capacitor, and on the basis of a result of a comparison between these values, decides whether to use the position command value that is on the basis of the command pattern in the positioning operation.

Advantageous Effects of Invention

The positioning control device according to the present invention can reduce the power consumption when it controls the positioning of a mechanical load using a motor.

DESCRIPTION OF EMBODIMENTS

Exemplary embodiments of a positioning control device according to the present invention will be explained below in detail with reference to the accompanying drawings. The present invention is not limited to the embodiments.

First Embodiment

Figure 1:
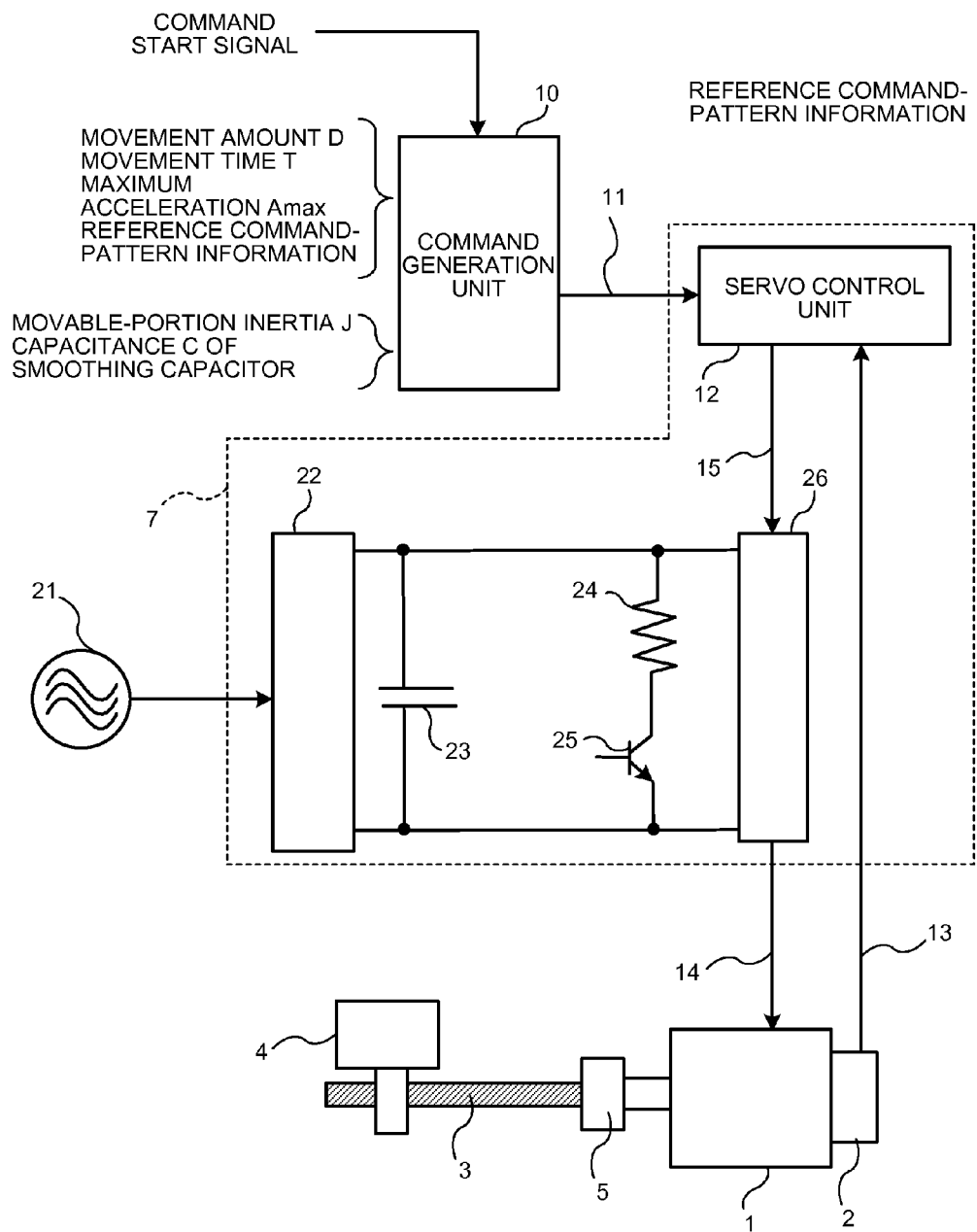
FIG. 1 is a block diagram illustrating an overall configuration of a positioning control device according to a first embodiment of the present invention.

FIG. 1 is a block diagram illustrating an overall configuration of a positioning control device according to a first embodiment of the present invention. FIG. 1 illustrates a motor 1, an encoder 2, a ball screw 3, a positioning head 4, a coupling 5, an amplifier 7, a command generation unit 10, and an AC power supply 21. For example, the ball screw 3, the positioning head 4, and the coupling 5 are mechanical loads connected to the motor 1.

The amplifier 7 receives a position command value 11, which is a command pattern for use of the positioning from the command generation unit 10, and supplies a current 14 to the motor 1 so as to make it follow the command value. The amplifier 7 includes a servo control unit 12, a converter unit 22, a smoothing capacitor 23, a regenerative resistance 24, a regenerative transistor 25, and an inverter unit 26. The regenerative resistance 24 and the regenerative transistor 25 are connected between bus-bars in parallel to the smoothing capacitor 23. The regenerative transistor 25 is provided to energize the regenerative resistance 24.

The motor 1 is driven by the current 14 from the amplifier 7, and serves as a driving source of a positioning control. The encoder 2 connected to the motor 1 detects a position and a velocity of the motor 1, and it outputs detected information 13, i.e., motor position and velocity information. The ball screw 3 is connected to the motor 1 by the coupling 5. Rotational motion of the motor 1 is converted to translational motion by the ball screw 3, and therefore motion of the positioning head 4 fixed to the ball screw 3 is controlled.

In an example illustrated in FIG. 1, the ball screw 3, the positioning head 4, and the coupling 5 constitute a mechanical load. FIG. 1 illustrates an example in which positioning of the mechanical load is controlled by using the ball screw 3. However, the present invention is not limited thereto, and it can use other mechanisms such as a timing belt or a rack-and-pinion drive. A number of these mechanisms can be combined to execute a positioning control of the mechanical load.

The AC power supply 21 supplies AC power to the amplifier 7. The amplifier 7 uses the supplied AC current so as to supply the current 14 to the motor 1 in the manner as described below. The converter unit 22, to which the AC power supply 21 is connected, rectifies AC power supplied from the AC power supply 21 and outputs the rectified AC power to the bus-bars. The converter unit 22 is configured from a diode stack, for example. The rectified AC power is converted to a DC power supply smoothed by the smoothing capacitor 23. This DC power supply generates a bus voltage between the bus-bars.

The regenerative transistor 25 turns ON when the bus voltage increases excessively during an operation of the motor 1 and causes the regenerative resistance 24 to consume regenerative power in order to decrease the bus voltage. The inverter unit 26 performs pulse width modulation (PWM). In accordance with a voltage command 15 described later, the inverter unit 26 supplies the motor 1 with the current 14 for driving the motor 1 so as to follow a command value.

The servo control unit 12 calculates the voltage command 15 such that the position of the motor 1 follows the position command value 11 that is a positioning command value for a positioning control. The position of the motor 1 is given to the servo control unit 12 as detected motor information 13 output from the encoder 2. As a specific example of calculating the voltage command 15, a feedback control is configured on the basis of the position command value 11 and the motor position 13. However, the calculation of the voltage command 15 is not limited thereto, and a feedforward control can also be used in combination with the feedback control. A servo amplifier and a general-purpose inverter are specific examples of the amplifier 7.

The command generation unit 10 generates and outputs the position command value 11 for a positioning control to the amplifier 7. The command generation unit 10 is a constituent element that has a primary function in the present embodiment. The command generation unit 10 generates a position command value on the basis of positioning-operation specification information such as a movement amount D during a positioning control, a movement time T that is a time from the start to the end of positioning, maximum acceleration $A_{max}$ that is the maximum allowable acceleration during a positioning control, movable-portion inertia J and a capacitance C of the smoothing capacitor 23, reference command-pattern information described later, and a command start signal that specifies the time at which the poisoning is started.

The movable-portion inertia J is a total value of the inertia of a portion that is movable with rotations of the motor 1. In FIG. 1, the movable-portion inertia J is a total value of inertia of a rotor portion of the motor 1 and the inertia of the positioning head 4, the ball screw 3, and the coupling 5. As a specific example of the command start signal, the command start signal is made up of ON and OFF, and generation of a position command value is started at the instant of switching the command start signal from OFF to ON. A programmable logic controller that controls the operation sequence of a machine, or other controller, generates a command start signal and gives this command start signal to the command generation unit 10.

Information regarding the movement amount D, the movement time T, and the maximum acceleration $A_{max}$ can be stored such that they are registered in advance in the command generation unit 10 as a point table. These pieces of information can be given to the command generation unit 10 in such a manner that the command generation unit 10 receives them from the programmable logic controller simultaneously with the positioning start signal. Information regarding the movable-portion inertia J and the capacitance C of the smoothing capacitor 23 is stored in advance in the command generation unit 10.

Figure 2:
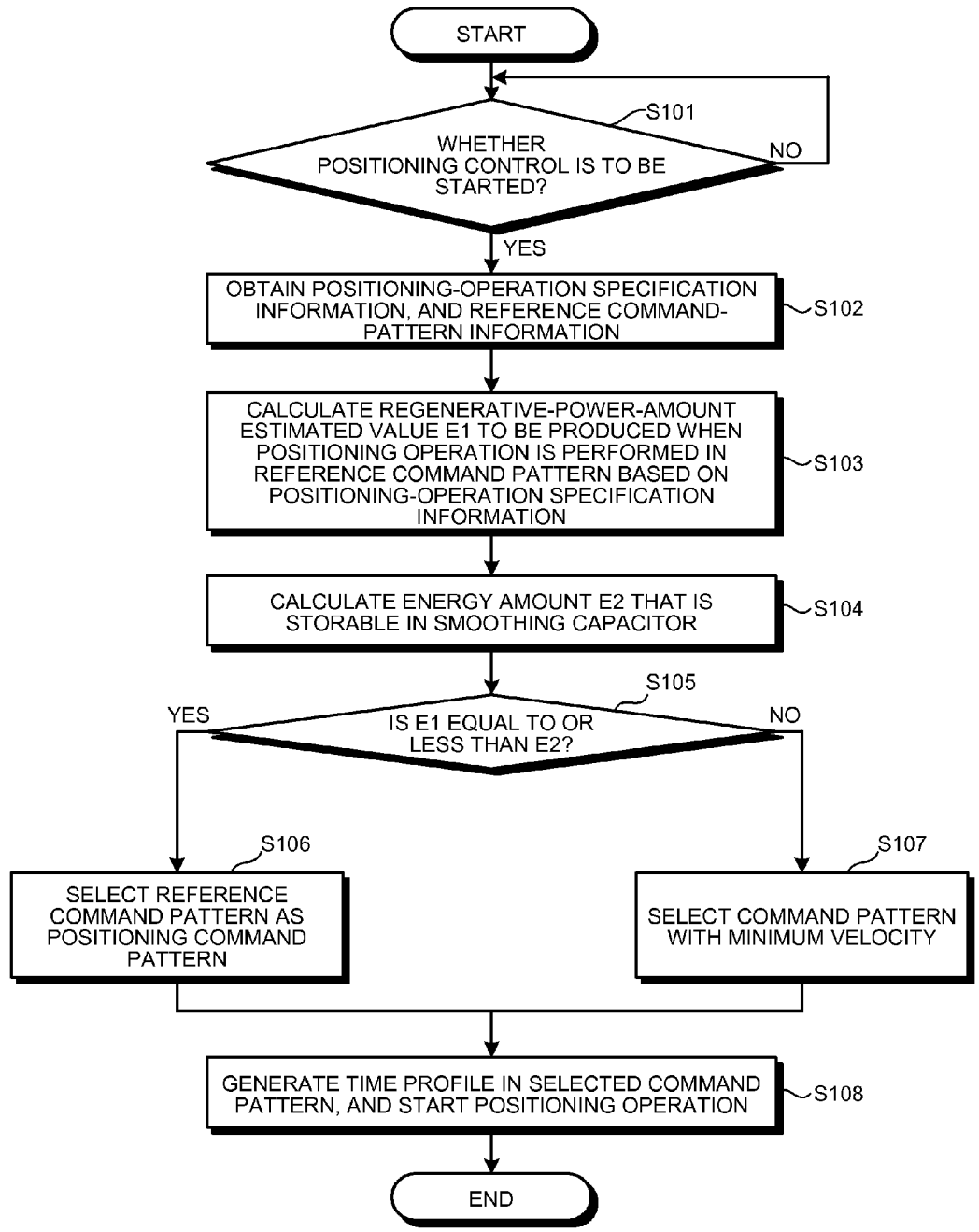
FIG. 2 is a flowchart illustrating a process procedure of a command generation unit according to the first embodiment of the present invention.

FIG. 2 is a flowchart illustrating a process procedure of the command generation unit 10 that has a primary function in the first embodiment of the present invention. The process flow in FIG. 2 is described below.

At Step S101, the command generation unit 10 monitors whether it is a time to start a positioning control. Specifically, the command generation unit 10 monitors the time at which a positioning start signal is switched from OFF to ON. When the command generation unit 10 determines that it is not a time to start a positioning control (NO at Step S101), the command generation unit 10 continues the monitoring. When the command generation unit 10 determines that it is a time to start a positioning control (YES at Step S101), the process flow shifts to Step S102.

At Step S102, the command generation unit 10 obtains positioning-operation specification information and reference command-pattern information. The positioning-operation specification information is information needed to configure a positioning command value. The movement amount D, the movement time T, and the maximum acceleration $A_{max}$ are specific examples of the positioning-operation specification information. The movement time indicates a time required for the mechanical load to start moving from a stopping state, then finish moving, and return to a stopping state. The maximum acceleration indicates an upper-limit value of an absolute value of the acceleration obtained by the mechanical load and the motor 1.

Figure 3:
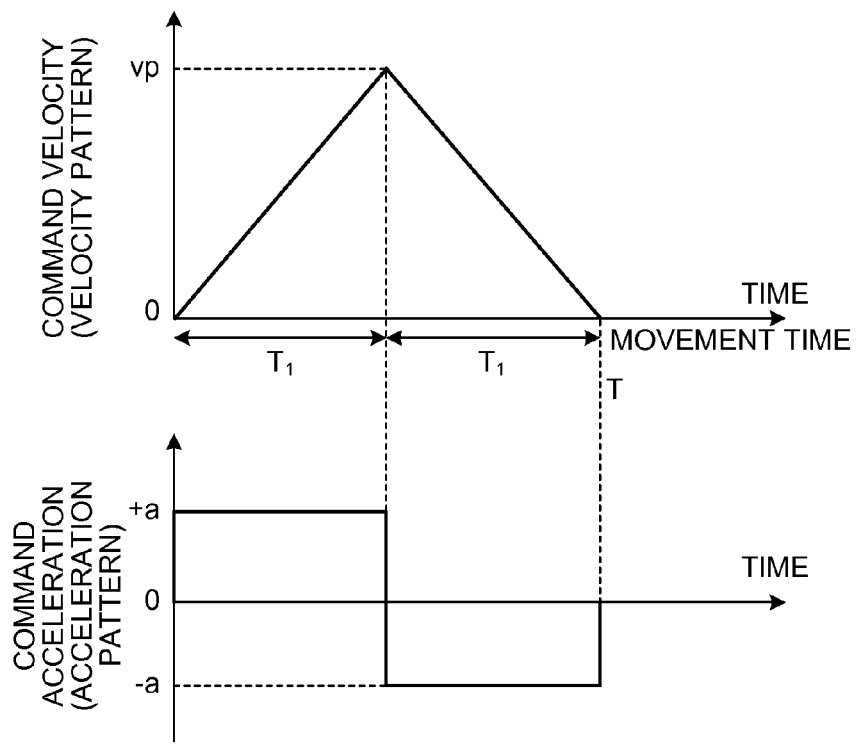
FIG. 3 is a diagram illustrating an example of a command velocity and command acceleration that are specified by a reference command pattern according to the first embodiment of the present invention.

The reference command-pattern information is information that is required for performing a positioning operation and that designates the shape of a positioning command value. The reference command-pattern information includes a command pattern that is command-velocity and command-acceleration pattern information. FIG. 3 is a diagram illustrating an example of a command velocity and command acceleration that are specified by a reference command pattern according to the first embodiment of the present invention. A specific example of the reference command-pattern information is information indicating that, when the command pattern used for a positioning control has a command value by which the command velocity forms a symmetrical triangle as illustrated in FIG. 3, the command pattern is a symmetrical triangle pattern. From the information indicating that the velocity forms a symmetrical triangle, and from the movement amount D and the movement time T, positioning-control command values can be uniquely specified such as the acceleration time and the deceleration time $T_1=T/2$, a peak velocity vp=2·D/T, and acceleration $a=4·D/T^2$.

FIG. 3 illustrates the waveform of the command velocity and the command acceleration. The command velocity that is a velocity pattern represents a differential of a position command value. The command acceleration that is an acceleration pattern indicates a signal obtained by differentiating the command velocity. A signal obtained by integrating the command velocity once is a positioning-control command value.

Figure 4:
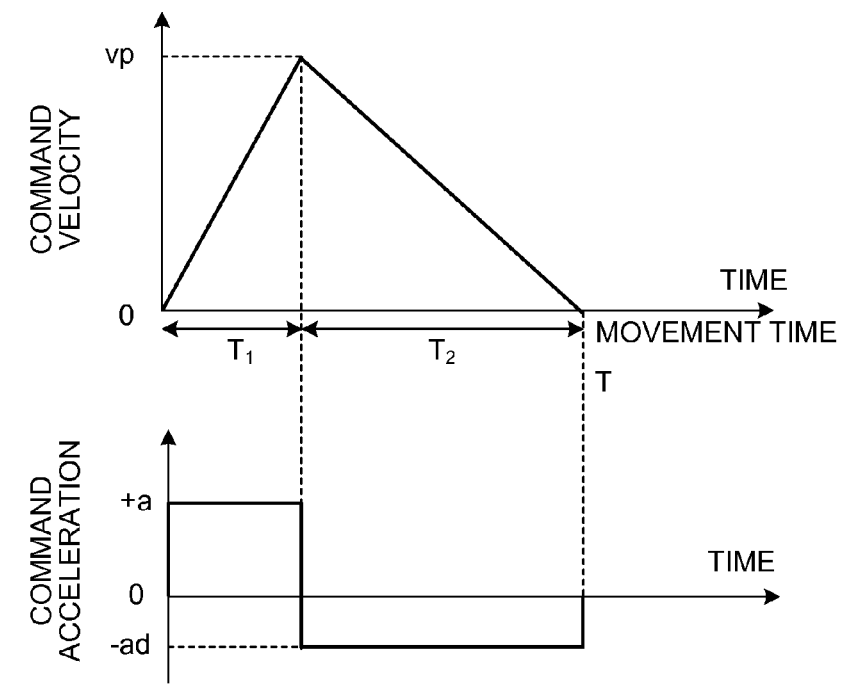
FIG. 4 is a diagram illustrating an example of a command velocity and command acceleration that are specified by another reference command pattern according to the first embodiment of the present invention.

FIG. 4 is a diagram illustrating an example of a command velocity and command acceleration that are specified by another reference command pattern according to the first embodiment of the present invention. Other examples of the reference command-pattern information are the acceleration "a" during an accelerating operation and information indicating that, when the command value used for a positioning control is a command value by which the command velocity forms an asymmetrical triangle as illustrated in FIG. 4, the command pattern is an asymmetrical triangle pattern. From these pieces of information, command values can be uniquely specified, such as the peak velocity vp=2·D/T, the acceleration time $T_1$=vp/a=2·D/(a·T), the deceleration time $T_2=T-T_1=T-2·D/(a·T)$, and the deceleration during deceleration ad=vp/T. The deceleration represents an absolute value of the acceleration during a decelerating operation.

Figure 5:
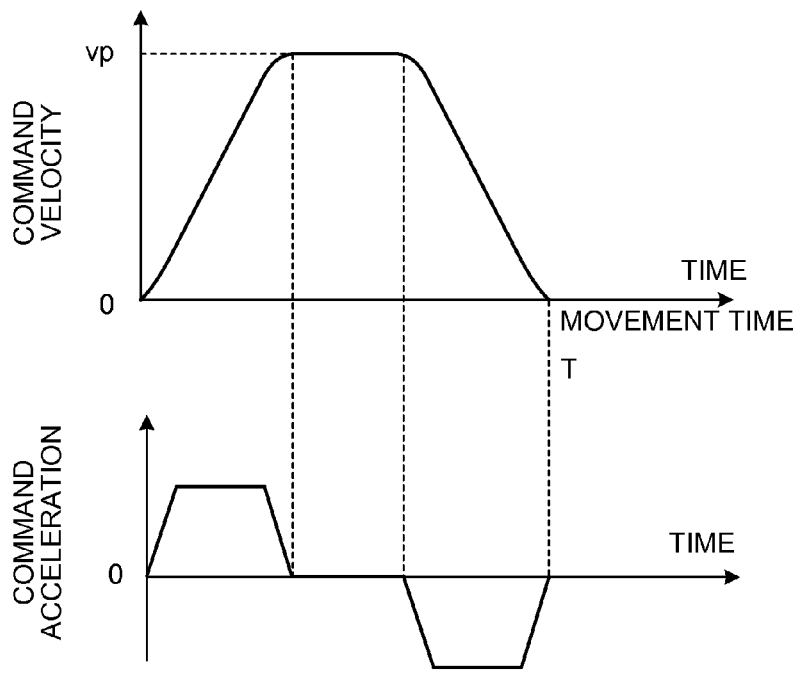
FIG. 5 is a diagram illustrating an example of a command velocity and command acceleration that are specified by another reference command pattern according to the first embodiment of the present invention.

FIG. 5 is a diagram illustrating an example of a command velocity and command acceleration that are specified by another reference command pattern according to the first embodiment of the present invention. Another example of the reference command-pattern information can include command-pattern information with the S-shaped acceleration/deceleration as illustrated in FIG. 5. The reference command-pattern information is not limited to the examples described above. Any command-pattern information can be used as long as the information specifies a command value to execute a positioning control in which a motor performs an accelerating operation from a stopping state, performs a decelerating operation, and thereafter returns to a stopping state.

At Step S103, the command generation unit 10 calculates a regenerative-power-amount estimated value E1 that is estimated to be produced when a positioning operation is performed according to a pattern with a positioning command value following the reference command-pattern information by a preset movement amount for a preset movement time designated by the positioning-operation specification information. This is one of the specific calculation methods and, on the basis of the peak velocity vp of a velocity command calculated from the positioning specification information and the reference command-pattern information that are obtained at Step S102 and on the basis of the movable-portion inertia J of the mechanical load and the motor 1, the command generation unit 10 calculates E1 as follows.

[Expression 1]

$$E1 = \tfrac{1}{2} \cdot J \cdot vp^2 \qquad (1)$$

At Step S104, the command generation unit 10 calculates energy E2 that is storable in the smoothing capacitor 23. This is one of the specific calculation methods and, by using the capacitance C of the smoothing capacitor 23, a reference bus-voltage value V0 and a bus-voltage value Von at which the regenerative transistor 25 is ON, the command generation unit 10 calculates E2 as follows.

[Expression 2]

$$E2 = \tfrac{1}{2} \cdot C \cdot Von^2 - \tfrac{1}{2} \cdot C \cdot V0^2 \qquad (2)$$

The reference bus-voltage value V0 indicates a steady voltage value that is output from a converter, i.e., a bus-voltage value when an AC power supply is connected to the amplifier 7, a voltage command is not given to an inverter, and a motor is not operated. In the case where a rectifying unit is a diode stack, a peak value of AC power-supply voltage, which is √2 times as high as an effective voltage of the AC power supply, corresponds to the reference bus-voltage value.

For example, at an AC power-supply voltage of AC 200 volts, 200×√2=283 volts, i.e., a peak value of the AC power supply, is approximately the reference bus voltage V0. This reference bus voltage V0, the capacitance C of the smoothing capacitor 23, and the bus-voltage value Von at which the regenerative transistor 25 is ON are also stored in advance in the command generation unit 10. Therefore, the command generation unit 10 can perform the calculation at Step S104.

At Step S105, the command generation unit 10 compares the regenerative-power-amount estimated value E1 calculated at Step S103 with the energy E2 that is storable in the smoothing capacitor 23 and calculated at Step S104. When the regenerative-power-amount estimated value E1 is equal to or less than the energy E2 that is storable in the smoothing capacitor 23 (YES at Step S105), the process flow shifts to Step S106. When the regenerative-power-amount estimated value E1 is not equal to or less than the energy E2 (NO at Step S105), the process flow shifts to Step S107.

At Step S106, a reference command pattern is selected as a positioning-control command pattern to be used as a positioning-control command value.

Figure 6:
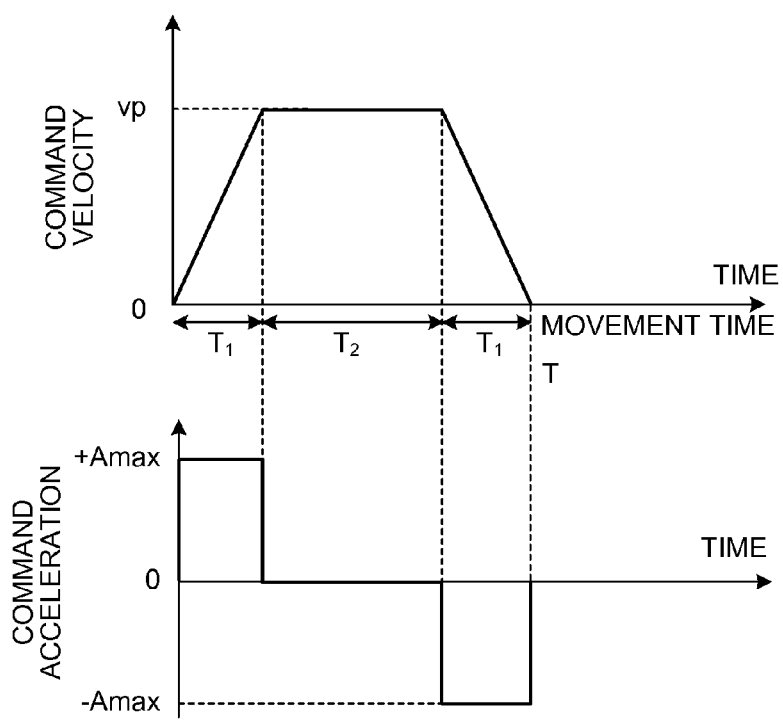
FIG. 6 is a diagram illustrating a waveform of command velocity and command acceleration with a minimum peak velocity of a motor according to the first embodiment of the present invention.

At Step S107, on the basis of given positioning-operation specification information, the command generation unit 10 selects a command pattern with the minimum peak velocity of the motor 1. FIG. 6 is a diagram illustrating a waveform of a command velocity and command acceleration with the minimum peak velocity of the motor 1 according to the first embodiment of the present invention. For example, when the positioning-operation specifications are the movement amount D and the movement time T, and further an upper-limit value of an absolute value of the acceleration is the maximum acceleration $A_{max}$, then a velocity pattern and an acceleration pattern are selected, in which an accelerating operation and a decelerating operation are performed always at the acceleration at which its absolute value is the maximum acceleration $A_{max}$, as illustrated in FIG. 6. A velocity pattern V(t) in FIG. 6 can be expressed as follows, where positioning is started at the time t=0.

[Expression 3]

$$V(t) = \begin{cases} \dfrac{vp}{T_1} t & (0 \le t \le T_1) \\ vp & (T_1 \le t \le T_1 + T_2) \\ vp - \dfrac{vp}{T_1}(t - T_1 - T_2) & (T_1 + T_2 \le t \le T) \end{cases} \qquad (3)$$

The acceleration time and the deceleration time are represented as $T_1$, a constant-velocity time is represented as $T_2$, and a constant velocity is represented as vp. Each of $T_1$, $T_2$, and vp is expressed as follows by using the movement amount D, the movement time T, and the maximum acceleration $A_{max}$.

[Expression 4]

$$T_1 = \tfrac{1}{2}\left(T - \sqrt{T^2 - 4\dfrac{D}{A_{max}}}\right) \qquad (4)$$

$$T_2 = \sqrt{T^2 - 4\dfrac{D}{A_{max}}}$$

$$vp = A_{max} \cdot T_1$$

When the process at Step S106 or Step S107 is finished, the process flow shifts to Step S108. At Step S108, the command generation unit 10 generates a positioning-control command value selected at Step S106 or Step S107 at a time interval, and it operates the motor 1 to start a positioning operation in practice. The motor 1 is not operated before shifting to Step S108. Upon selecting a positioning-control command value at Step S106 or S107, a positioning control is started in practice at Step S108.

In this manner, the positioning control device executes a positioning control according to the processes illustrated in the flowchart in FIG. 2, and therefore can decrease the power consumption amount during a positioning operation. In the flowchart in FIG. 2, the processes related to a single positioning operation are described. In a case of intermittently performing a positioning operation multiple times, when the present positioning operation is completed, the process flow returns to Step S101, and the same processes are repeated in the next positioning operation.

Figure 7:
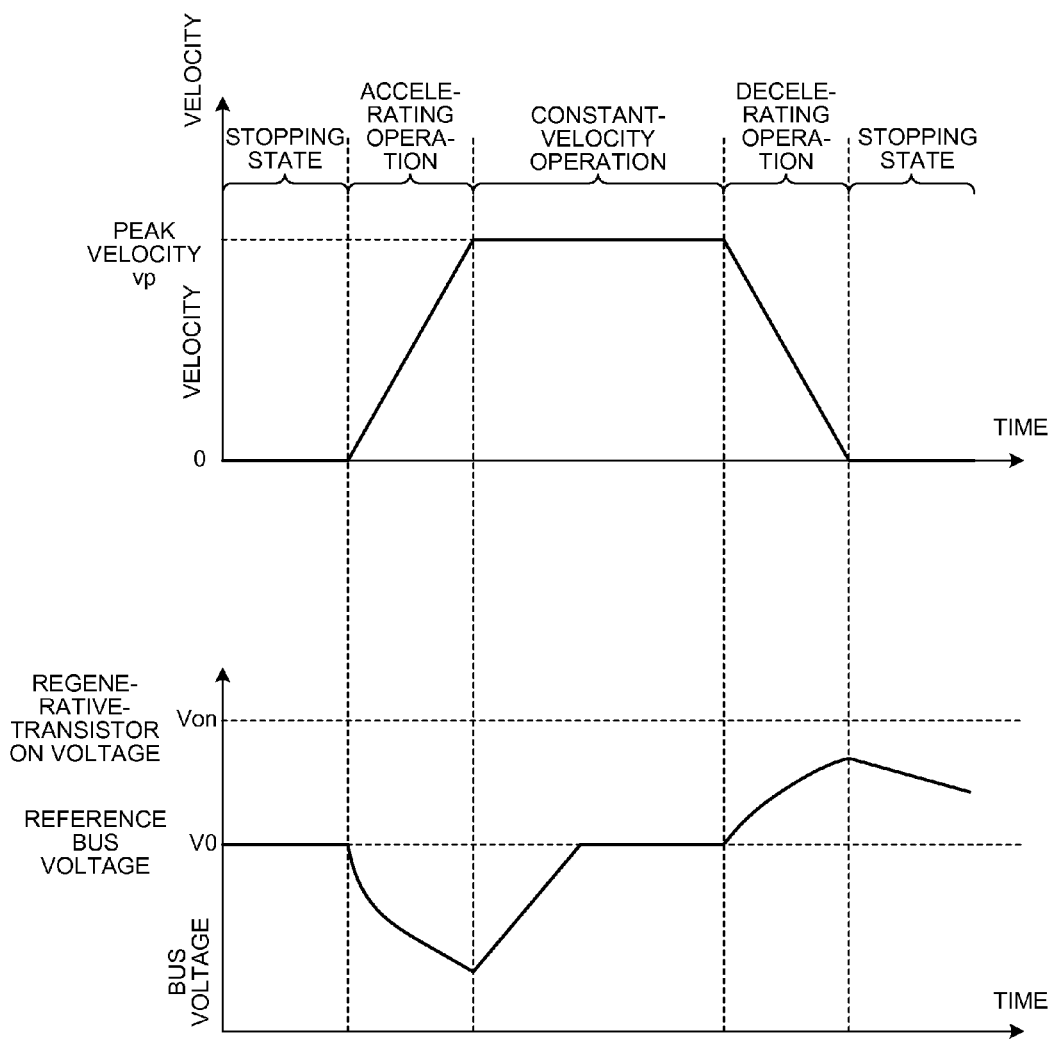
FIG. 7 is a diagram illustrating a typical example of the relation between motor velocity and bus voltage of an amplifier during a positioning operation according to the first embodiment of the present invention.

Next, effects of the present embodiment are described. FIG. 7 is a diagram illustrating a typical example of the relation between motor velocity and bus voltage of an amplifier when a positioning operation is performed according to the first embodiment of the present invention. The following descriptions are made by using an exemplary case where the velocity increases linearly during an accelerating operation, and decreases linearly during a decelerating operation as illustrated in FIG. 7. However, even when the accelerating operation/decelerating operation employs a pattern other than the linear acceleration/deceleration pattern, such as an S-shaped command, the following descriptions still remain sustained. Further, the motor velocity is controlled by the amplifier 7 so as to follow a command velocity, that is, a velocity pattern. Therefore, the motor velocity is considered substantially identical to the command velocity, that is, the velocity pattern.

A bus voltage immediately before performing a positioning operation is a reference bus voltage when an initial positioning operation has not yet been performed since a supply of AC voltage from the AC power supply 21 to the amplifier 7, or when a sufficient amount of time has elapsed since the last positioning operation. Upon performing a positioning operation, the motor 1 displays a behavior in the following manner. The motor 1 performs an accelerating operation from a stopping state, that is, from the 0-velocity state, and thereafter maintains a constant velocity. When the position of the motor 1 comes near to a target distance, the motor 1 performs a decelerating operation and then stops.

At this time, the bus voltage is varied depending on whether the motor 1 is in an accelerating state where the motor 1 is working, or in a regenerative state where work is performed on the motor 1. When the motor 1 performs an accelerating operation, the motor 1 consumes power so as to give kinetic energy to the motor 1 and the mechanical load. Because the amplifier 7 consumes power to supply energy to the motor 1, the bus voltage displays a behavior such that it become lower than the reference bus-voltage value. When the bus voltage becomes equal to or lower than the reference bus voltage, the converter unit 22 supplies power such that the bus voltage becomes the reference bus-voltage value. In a case of a low friction of the mechanical load, the motor 1 does not need to generate greater torque during the time in which the motor 1 runs at a constant velocity. Therefore, work performed by the motor 1 is considered almost 0. Accordingly, the motor 1 hardly consumes power. Consequently, during the period in which the motor 1 is at a constant velocity, power is supplied from the converter unit 22, and thus the bus voltage returns to a value at around the reference bus voltage. When the motor 1 performs a decelerating operation, kinetic energy of the motor 1 and the mechanical load is decreased, and thus regenerative power is produced. The decreased kinetic energy is converted to regenerative power, and therefore the bus voltage increases from the reference bus-voltage value.

As described above, when the bus voltage increases and reaches a regenerative-transistor ON voltage that is a preset voltage value, then the regenerative transistor 25 is ON, and regenerative power is consumed by the regenerative resistance 24. Therefore, the bus voltage decreases to lower than the regenerative-transistor ON voltage. However, as illustrated in FIG. 7, even when the motor 1 performs a decelerating operation, and enters a regenerative state, the bus voltage may not reach the regenerative-transistor ON voltage. In that case, regenerative power is not consumed by the regenerative resistance 24. Even when the motor 1 performs a decelerating operation, the bus voltage may not reach the regenerative-transistor ON voltage. In that case, regenerative power is stored in the smoothing capacitor 23 between the bus-bars. As more regenerative power is stored in the smoothing capacitor 23, the more the bus voltage increases. The regenerative power amount to be produced during a positioning operation is considered as kinetic energy of the mechanical load. Because during a decelerating operation, the motor 1 shifts from the peak velocity to stopping that is the 0-velocity state, the regenerative-power-amount estimated value E1 to be produced during a positioning operation is derived from the expression (1) that shows kinetic energy calculated from the peak velocity.

Assuming that this regenerative-power-amount estimated value E1 is all stored in the smoothing capacitor 23, regenerative power is not consumed by the regenerative resistance 24. How much energy can be stored in the smoothing capacitor 23 can be estimated by the expression (2). This is equivalent to the difference between energy ($=\frac{1}{2} \cdot C \cdot Von^2$) stored in the smoothing capacitor 23 when the bus-voltage value is the regenerative-transistor ON voltage value, and energy ($\times \frac{1}{2} \cdot C \cdot V0^2$) stored in the smoothing capacitor 23 when the bus-voltage value is the reference bus-voltage value. That is, the expression (2) expresses the amount of energy that can be stored when the bus voltage increases from the reference bus voltage to the regenerative-transistor ON voltage.

The regenerative-power-amount estimated value E1 to be produced during the present positioning operation, which is calculated by the expression (1), is compared with the energy value E2 that is storable in the smoothing capacitor 23, which is calculated by the expression (2). When E1 is smaller than E2, the regenerative power amount to be produced during a positioning operation is not consumed by the regenerative resistance 24 during the present positioning operation, but is all stored in the smoothing capacitor 23. It is possible to reuse the regenerative power amount stored in the smoothing capacitor 23 during the next positioning operation. The power amount required for a positioning operation is made up of a power amount for a motor output and a power amount for power loss. In a case of using a high-efficiency motor 1 such as a servo motor, power for a motor output is more dominant than power loss. Power for a motor output is converted to kinetic energy for the motor 1 and the mechanical load mainly during an accelerating operation.

At Step S105 in FIG. 2, when the process flow is determined to shift to Step S106 (YES at Step S105), even though a positioning operation is performed using a reference command pattern, the power consumption amount is still small during the positioning operation, because kinetic energy given to the mechanical load by the motor 1 during an accelerating operation is efficiently utilized. By selecting an S-shaped command or other commands that are effective in reducing shocks and vibrations as a reference command pattern, the positioning control device can execute a positioning control, while achieving both a reduction in power consumption amount and a reduction in vibrational shocks to a certain extent.

Meanwhile, at Step S105 in FIG. 2, when the regenerative-power-amount estimated value E1 to be produced during the present positioning operation is determined to be greater than the energy value E2 that is storable in the smoothing capacitor 23 (NO at Step S105), regenerative power is too great to be stored in the smoothing capacitor 23 when the positioning operation is performed, and it is therefore partially consumed by the regenerative resistance 24. The regenerative power consumed by the regenerative resistance 24 is converted to heat, and therefore cannot be reused during the next positioning operation. The power amount, which is consumed by the regenerative resistance 24 and which cannot therefore be reused, is minimized. This leads to a reduction in power consumption amount during a positioning operation. The regenerative power amount indicates kinetic energy of the motor 1 and the mechanical load. Therefore, in a command pattern, kinetic energy is minimized, that is, when the peak velocity becomes as low as possible under the condition of the maximum acceleration $A_{max}$, which is an upper-limit value of the acceleration. That is, such command patter is as illustrated by the expression (3), in which the regenerative power amount to be consumed by the regenerative resistance 24 can be minimized, and accordingly the power consumption amount during a positioning operation is decreased.

In the command pattern illustrated by the expression (3), the motor 1 performs an accelerating operation always at the maximum acceleration $A_{max}$ in order to move the mechanical load by the preset movement amount D for the preset movement time T, then maintains the accelerating operation for the preset constant-velocity time, and thereafter performs a decelerating operation always at maximum acceleration $-A_{max}$. Assuming that an upper-limit value of the acceleration is not set, a command pattern, in which the velocity is lowest among the command patterns in which the mechanical load moves by the movement amount D for the movement time T, is a command pattern in which the mechanical load moves at a velocity D/T from the time 0, that is at the start, to the time T. In this command pattern, the acceleration time and the deceleration time are both 0. However, in the command pattern as described above, the acceleration is infinite. Therefore, when an upper-limit value of the acceleration is set, it is impossible to implement this command pattern.

Therefore, in order to perform positioning by the preset movement amount D for the preset movement time T so as to minimize the peak velocity, while the absolute value of the acceleration is made equal to or less than $A_{max}$, it is necessary to perform an accelerating operation for a shortest time as possible, and to perform a decelerating operation for a shortest time as possible. That is, it is an operation to perform an accelerating operation and a decelerating operation at the maximum acceleration $A_{max}$. This command pattern is illustrated by the expression (3). In this command pattern, the peak velocity is minimized when an upper-limit value of the acceleration is set.

In the present embodiment, there has been described the example, in which when the energy amount E2 that is storable in the smoothing capacitor 23 is calculated, the calculation expression (2) is used to calculate the energy amount E2 on the basis of information regarding the capacitance C of the smoothing capacitor 23, the bus-voltage value Von at which the regenerative transistor 25 is ON, and the reference bus voltage V0. Therefore, assuming that there is no change in the amplifier 7, a calculation value derived from the expression (2) remains unchanged. Accordingly, the energy amount that is storable in the smoothing capacitor 23, which is associated with the amplifier 7, is calculated in advance by using the expression (2). This calculated value can be stored in the command generation unit 10 in order that the command generation unit 10 obtains this value so as to process.

Second Embodiment

In the first embodiment, there has been described the example in which the expression (2) is used to calculate the regenerative power amount that is storable in the smoothing capacitor 23. The calculation method is not limited thereto. In a second embodiment of the present invention, an example of calculating the regenerative power amount using an expression other than the expression (2) is described.

Figure 8:
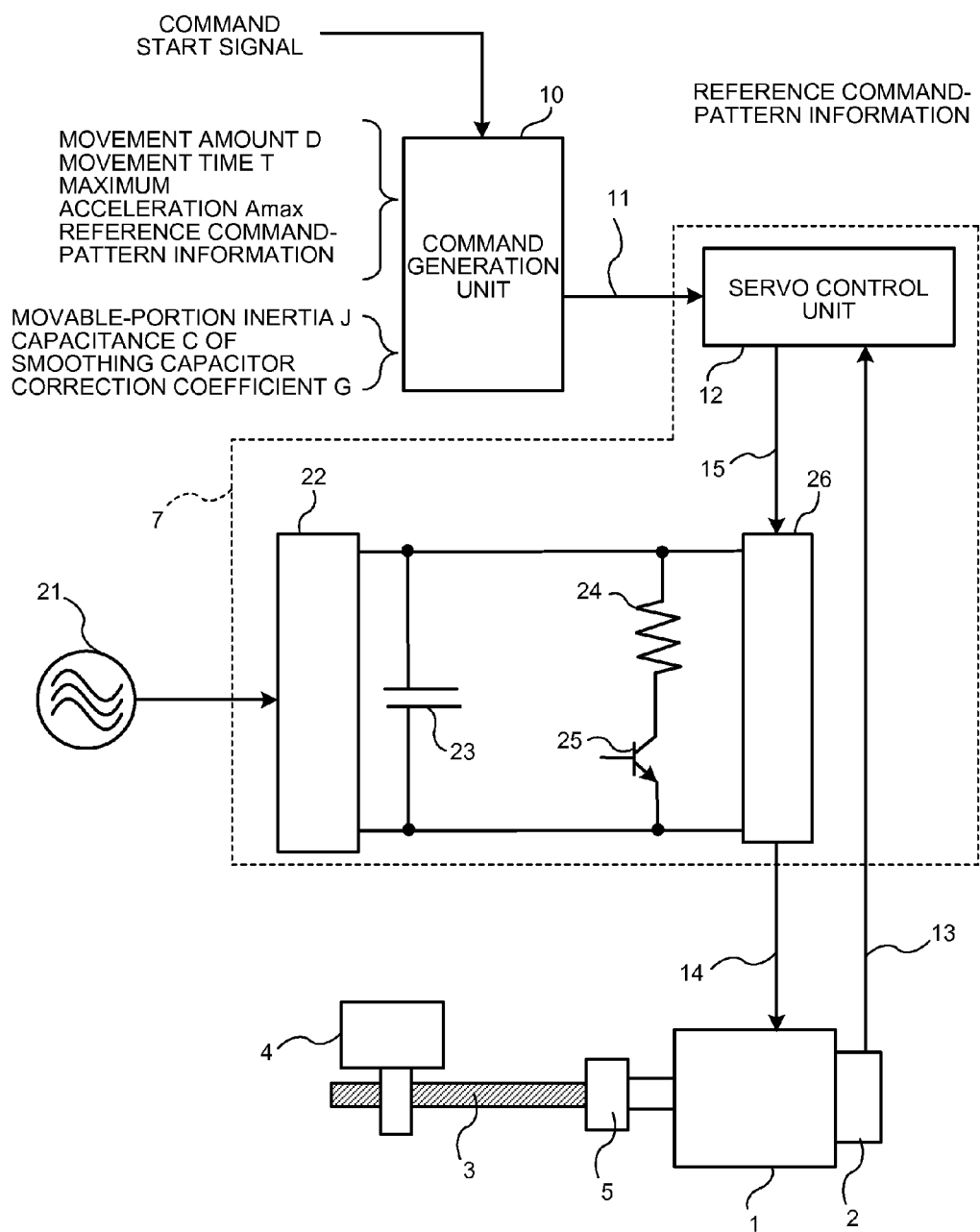
FIG. 8 is a block diagram illustrating an overall configuration of a positioning control device according to a second embodiment of the present invention.

FIG. 8 is a block diagram illustrating an overall configuration of a positioning control device according to the second embodiment of the present invention. The block diagram in FIG. 8 is similar to the block diagram in FIG. 1. The portions denoted by the same reference signs as those in FIG. 1 are basically assumed to function in the same manner, and therefore descriptions thereof will be omitted. There is a difference in the command generation unit 10 between FIG. 8 and FIG. 1. In the command generation unit 10 in FIG. 1, information regarding the movable-portion inertia J and the capacitance C of the smoothing capacitor 23 is input thereto, or is stored in advance. In contrast thereto, in the command generation unit 10 in FIG. 8, in addition to the movable-portion inertia J and the capacitance C of the smoothing capacitor 23, information regarding a correction coefficient G that is greater than 1 is input thereto, or is stored in advance. This correction coefficient G is described later in detail.

Figure 9:
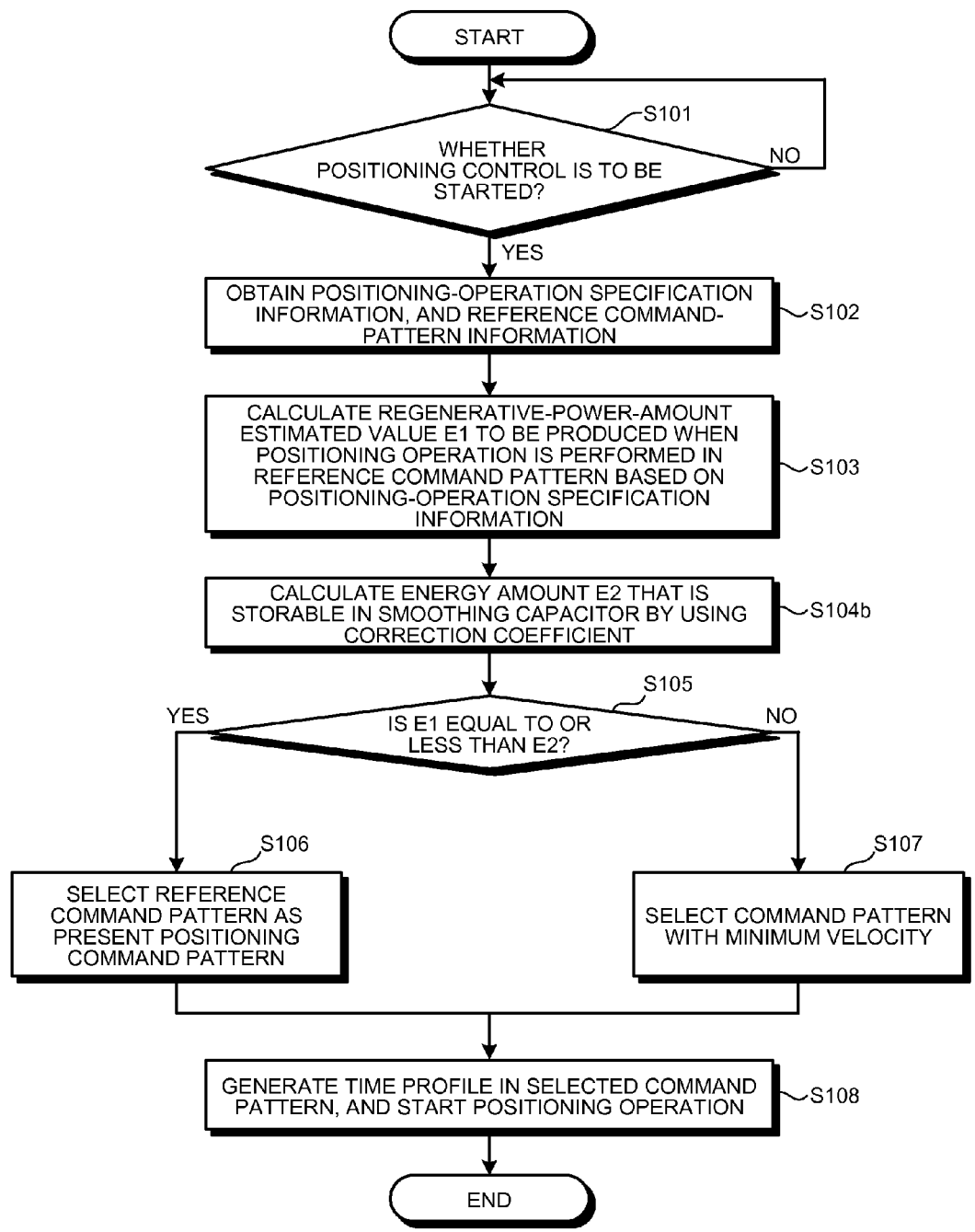
FIG. 9 is a flowchart illustrating a process procedure of a command generation unit according to the second embodiment of the present invention.

FIG. 9 is a flowchart illustrating a process procedure of the command generation unit 10 according to the second embodiment of the present invention. The flowchart in FIG. 9 is similar to the flowchart in FIG. 2. In FIG. 9, steps denoted by same numbers in FIG. 2 are basically assumed to perform processes same as those of FIG. 2, and therefore descriptions thereof will be omitted.

The flowchart in FIG. 9 is different from the flowchart in FIG. 2 in that Step S104 in FIG. 2 is replaced with Step S104b in FIG. 9. At Step S104b, the command generation unit 10 calculates the energy amount E2 to be stored in the smoothing capacitor 23 by using the capacitance C of the smoothing capacitor 23, the regenerative-transistor ON voltage Von, the reference bus voltage V0, and the correction coefficient G (>1). These pieces of information are used to calculate the energy amount E2 that is storable in the smoothing capacitor 23 as expressed by the following expression (5).

[Expression 5]

$$E2 = (\tfrac{1}{2} \cdot C \cdot Von^2 - \tfrac{1}{2} \cdot C \cdot V0^2) \cdot G \qquad (5)$$

When the process at Step S104b is finished, the process flow shifts to the processes at Step S105 and the subsequent steps. In FIG. 9, processes at Step S105 and the subsequent steps are the same as those in FIG. 2 in the first embodiment, and therefore descriptions thereof will be omitted. According to the processes in FIG. 9, the positioning control device executes a positioning control, and therefore can decrease the power consumption amount during a positioning operation.

Also in the present embodiment, before performing a positioning operation in practice, the command generation unit 10 calculates the regenerative-power-amount estimated value E1 when the motor 1 operates in a reference command pattern, and selects a positioning-control command value according to a result of the comparison between this regenerative-power-amount estimated value E1 and the energy value E2 to be stored in the smoothing capacitor 23. This operation is the same as in the first embodiment, and therefore an effect of decreasing the power consumption amount during a positioning operation can be obtained.

Effects, which cannot be obtained from the first embodiment but from the present embodiment, are described. The second embodiment is different from the first embodiment in that the energy amount, storable in the smoothing capacitor 23, is calculated using the expression (5) instead of the expression (2). Between the expression (5) and the expression (2), the energy amount E2 is different with a factor of the correction coefficient G. Because the correction coefficient G is greater than 1, the amount of energy to be stored in the smoothing capacitor 23 is calculated to be greater in the present embodiment than a value calculated by the expression (2). What this means physically is described with reference to FIGS. 10 and 11.

Figure 10:
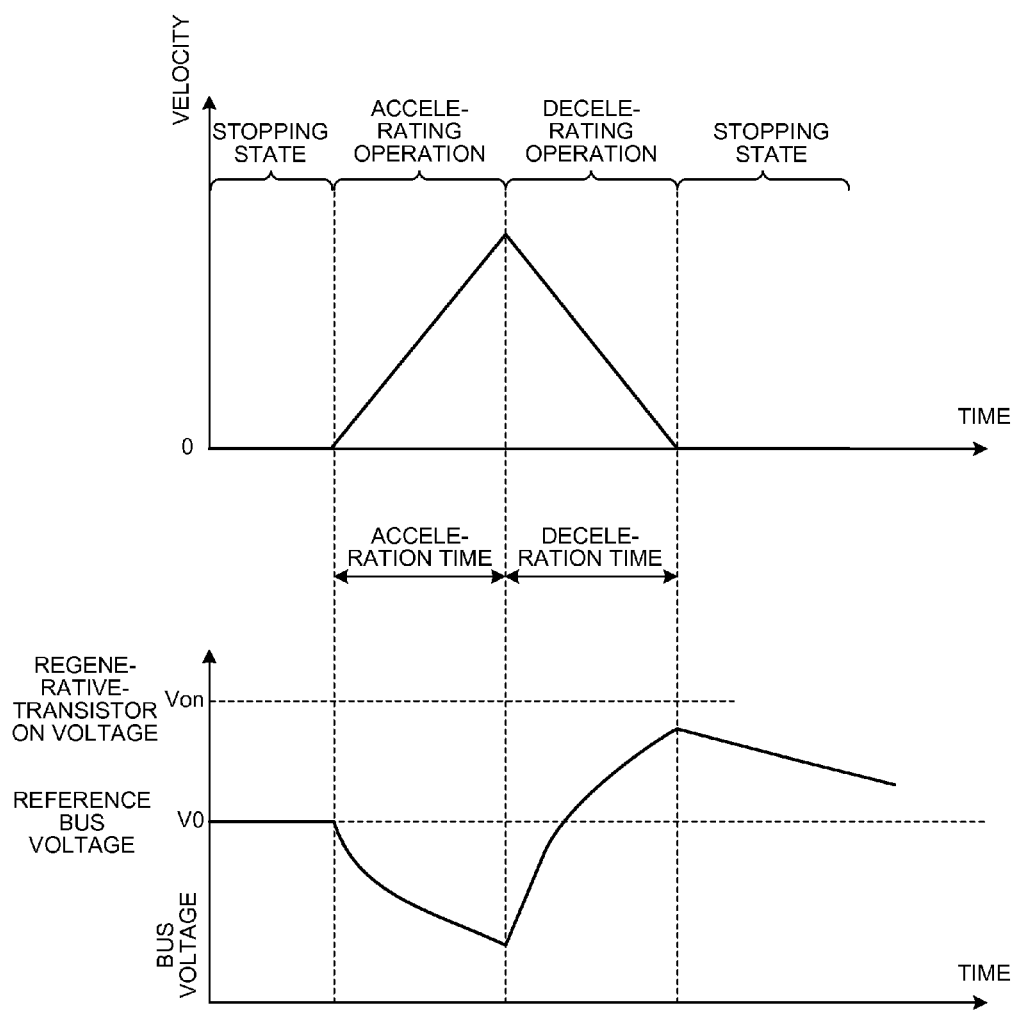
FIG. 10 is a diagram illustrating the relation between velocity and bus voltage in the second embodiment of the present invention when a positioning operation is performed in which there is no constant-velocity time.

FIG. 10 is a diagram illustrating the relation between velocity of the motor 1 and bus voltage when a positioning operation is performed according to a command pattern, in which there is not any constant-velocity time. That is, the motor 1 performs a decelerating operation immediately after finishing an accelerating operation. As described in the first embodiment, upon performing an accelerating operation, the motor 1 consumes power, and therefore the bus voltage decreases. On the other hand, upon performing a decelerating operation, the motor 1 enters a regenerative state, and therefore the bus voltage increases.

As illustrated in FIG. 10, when the motor 1 starts a decelerating operation immediately after finishing an accelerating operation, the value of bus voltage when starting the decelerating operation is smaller than the reference bus voltage V0 because the bus voltage has decreased during the accelerating operation. From the point when the motor 1 starts a decelerating operation, regenerative power is produced, and therefore the bus voltage starts increasing. The energy amount that can be stored in the smoothing capacitor 23 depends on the difference between the squares of bus voltages. In the expression (2), the energy amount is represented as the difference between the square of the regenerative-transistor ON voltage Von and the square of the reference bus voltage V0. As this difference is greater, it is possible to store more energy. On the other hand, as this difference is smaller, the less energy can be stored. However, in the case of FIG. 10, the value of bus voltage when starting a decelerating operation is smaller than the reference bus voltage V0. Therefore, more energy than a value shown by the expression (2) can be stored in the smoothing capacitor 23.

Figure 11:
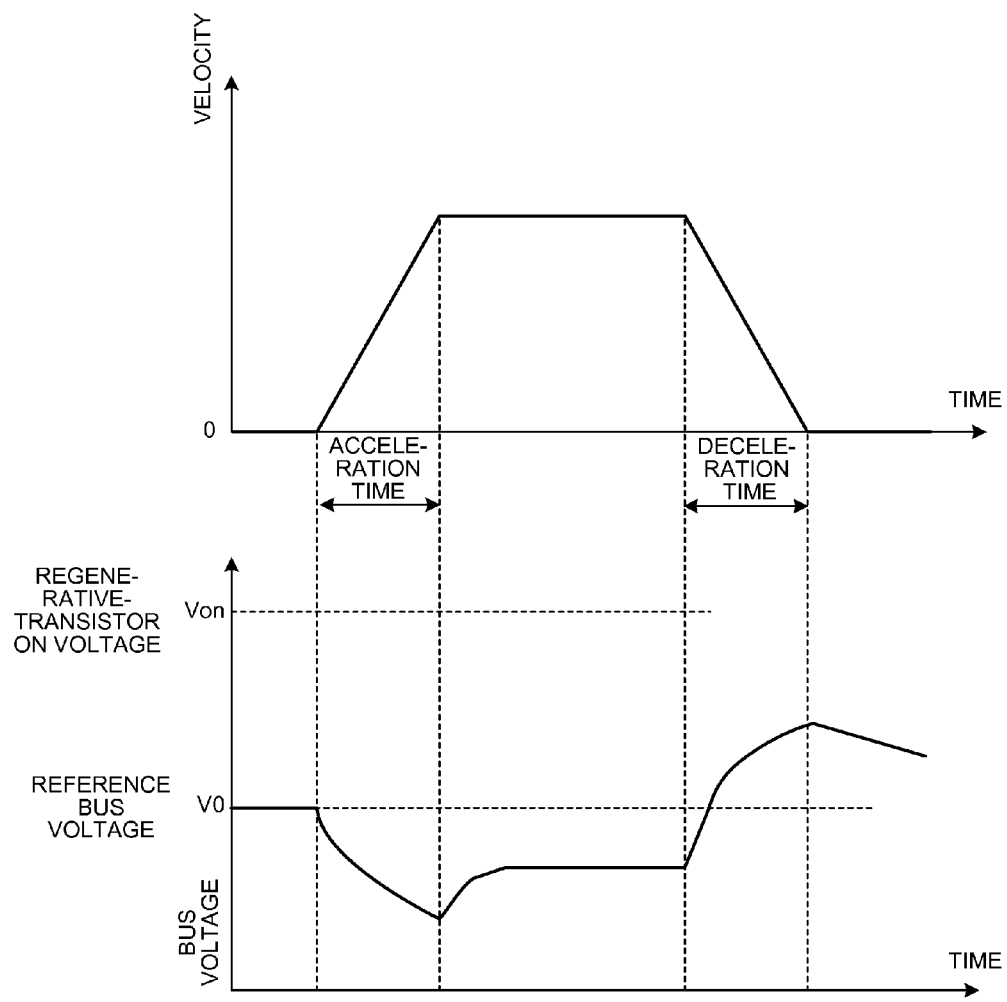
FIG. 11 is a diagram illustrating the relation between velocity and bus voltage in the second embodiment of the present invention when a positioning operation is performed in the case of a relatively high friction of the mechanical load.

FIG. 11 is a diagram illustrating the relation between motor velocity and bus voltage when a positioning operation is performed in a command pattern in which there is a constant-velocity time, which happens in the case with a relatively high friction of the mechanical load. When the motor performs an accelerating operation, the bus voltage becomes lower, and when the motor performs a decelerating operation, the bus voltage becomes higher. This operation is the same as described above. A part of the power consumed by the motor 1 includes power consumption for a motor output. The motor output is expressed by the product of motor torque and motor velocity. When a friction of the mechanical load is low, the motor torque becomes substantially 0 at a constant velocity, and accordingly an output of the motor 1 becomes substantially 0. Therefore, the motor 1 hardly consumes power. However, when a friction of the mechanical load is relatively higher, the motor torque also becomes higher at a constant velocity due to the friction of the mechanical load, and accordingly the motor output is not 0. Consequently, the motor driving device consumes power. When the motor 1 is at a constant velocity or immediately before the motor 1 starts a decelerating operation, the bus voltage displays a behavior in such a manner as to become lower than the reference bus voltage V0.

As illustrated in FIGS. 10 and 11, when the bus voltage immediately before the motor 1 performs a decelerating operation is lower than the reference bus voltage V0, a regenerative power amount greater than an energy value to be stored in the smoothing capacitor 23, which is calculated by the expression (2), can be stored during a decelerating operation. The energy value that can be stored in the smoothing capacitor 23, which is calculated by the expression (2), is multiplied by the correction coefficient G (>1) as shown in the expression (5). Therefore, the energy value that can be stored in the smoothing capacitor 23 in this circumstance can be estimated more accurately.

For example, it is considerable to measure a bus-voltage value immediately before the start of a decelerating operation when a positioning operation is performed in advance, and to decide the correction coefficient G as a ratio between an energy value that is storable in the smoothing capacitor 23 that is calculated from the measured bus-voltage value and an energy value that is storable in the smoothing capacitor 23 which is calculated by the expression (2). The energy value that is storable in the smoothing capacitor 23 and that is calculated from the bus-voltage value is a value calculated by substituting the bus-voltage value immediately before the start of a decelerating operation for the reference bus voltage.

In the present embodiment, before the positioning starts, the regenerative power amount to be produced during the present positioning operation and the amount of energy that is storable in the smoothing capacitor 23 are calculated. According to a result of the comparison between these amounts, positioning command patterns are selectively used. Because this operation is the same as in the first embodiment, the present invention has same effects to those in the first embodiment. Further, according to the present embodiment, as compared to the first embodiment, the amount of energy to be stored in the smoothing capacitor 23 is estimated more accurately. This makes it possible to select a command value that is more advantageous to reduce the consumption power amount during a positioning operation.

Third Embodiment

In the first and second embodiments, there has been described the example in which the regenerative power amount that is storable in the smoothing capacitor 23 is calculated on the basis of the reference bus voltage V0. However, it is possible to calculate the energy E2 that is storable in the smoothing capacitor 23 without using the reference bus voltage V0. In a third embodiment of the present invention, such a case is described.

Figure 12:
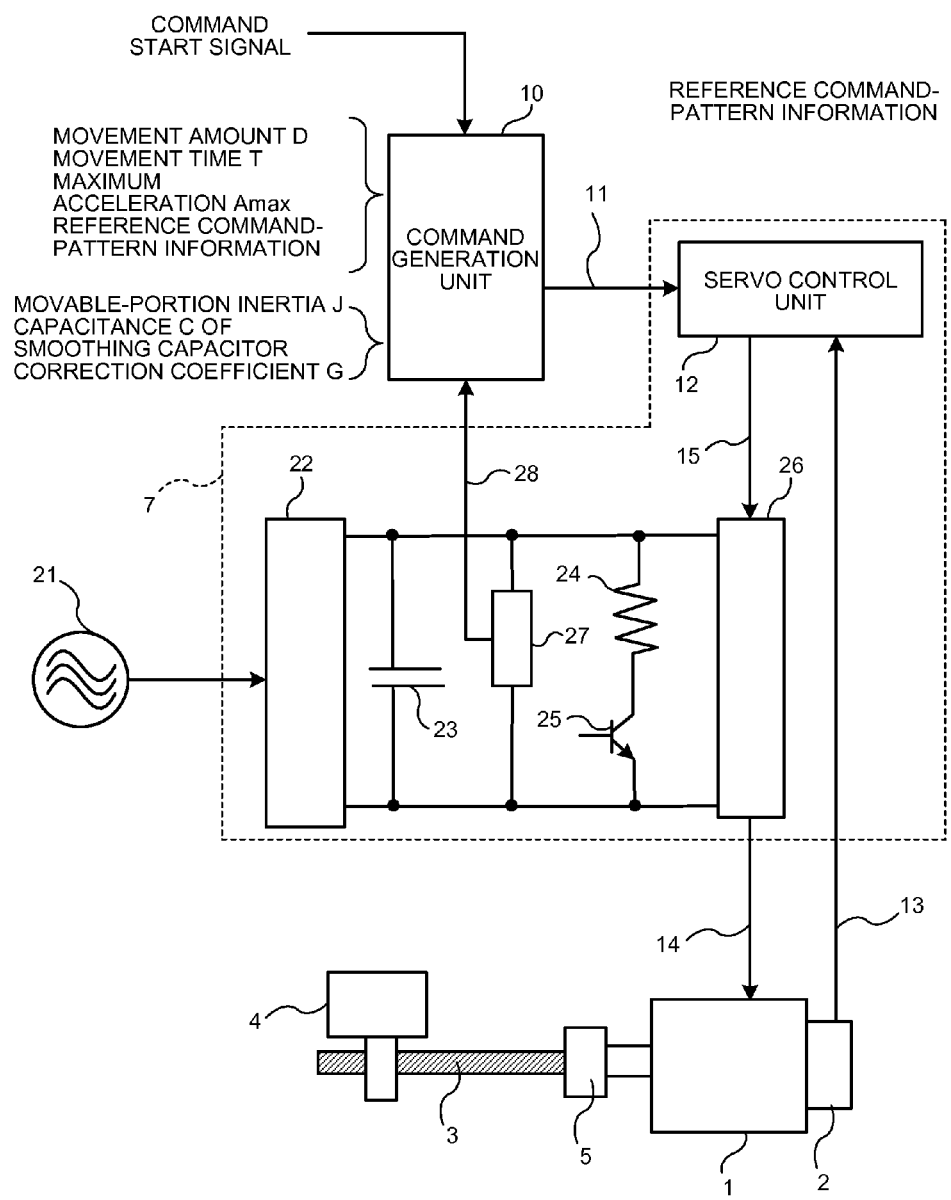
FIG. 12 is a block diagram illustrating an overall configuration of a positioning control device according to a third embodiment of the present invention.

FIG. 12 is a block diagram illustrating an overall configuration of a positioning control device according to the third embodiment of the present invention. The block diagram in FIG. 12 is similar to the block diagram in FIG. 1 described in the first embodiment, and is also similar to the block diagram in FIG. 8 described in the second embodiment. The portions denoted by same reference signs as those in FIG. 1 and FIG. 8 are basically assumed to operate in the same manner, and therefore descriptions thereof will be omitted. FIG. 12 is different from FIG. 1 and FIG. 8 in that a bus-voltage detecting circuit 27 is provided in FIG. 12, and a detected bus-voltage value 28 (Vdc) is input to a command generation unit 10.

Figure 13:
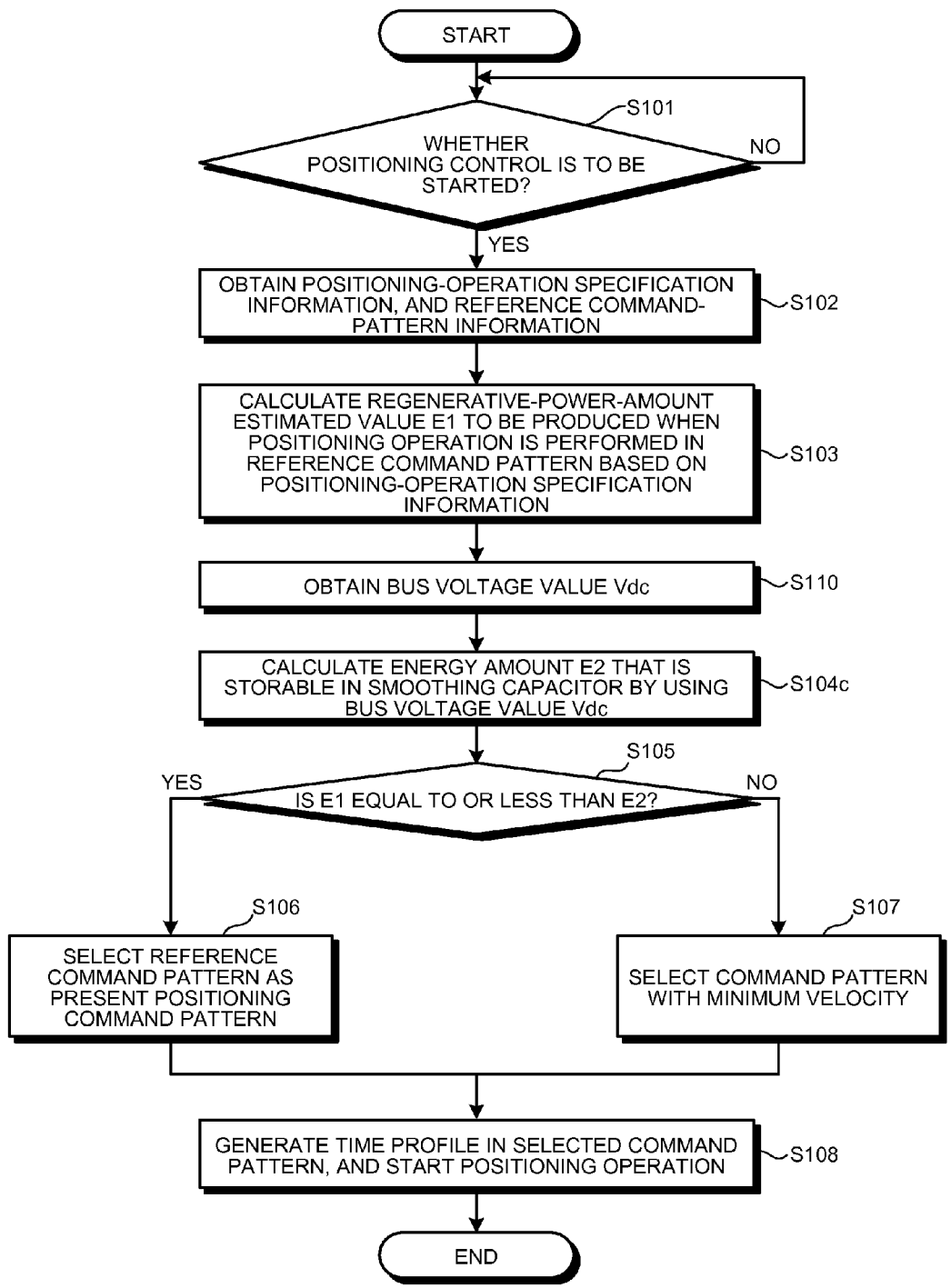
FIG. 13 is a flowchart illustrating a process procedure of a command generation unit according to the third embodiment of the present invention.

FIG. 13 is a flowchart illustrating a process procedure of the command generation unit 10 according to the third embodiment of the present invention. The flowchart in FIG. 13 is similar to the flowchart in FIG. 2 described in the first embodiment, and is also similar to the flowchart in FIG. 9 described in the second embodiment. In FIG. 13, steps denoted by same numbers in FIGS. 2 and 9 are basically assumed to perform processes same as those of FIGS. 2 and 9, and therefore descriptions thereof will be omitted.

The flowchart in FIG. 13 is different from the flowchart in FIG. 2 in that after performing the process at Step S103, a process is performed to detect the bus-voltage value Vdc in the bus-voltage detecting circuit 27 at Step S110. Thereafter, at Step S104c, the detected bus-voltage value 28 (Vdc) is used to calculate the energy amount E2 that is storable in the smoothing capacitor 23. The specific calculation is expressed by the following expression (6).

[Expression 6]

$$E2 = \tfrac{1}{2} C \cdot Von^2 - \tfrac{1}{2} \cdot C \cdot Vdc^2 \qquad (6)$$

The expression (6) is different from the expression (2) in that the reference bus voltage V0 is replaced with the bus voltage Vdc. As described in the second embodiment, the expression (6) can be further multiplied by the correction coefficient G (>1) to calculate the energy amount E2 that is storable in the smoothing capacitor 23. That is, the energy amount E2 can be calculated by the following expression (7).

[Expression 7]

$$E2 = (\tfrac{1}{2} \cdot C \cdot Von^2 - \tfrac{1}{2} \cdot C \cdot Vdc^2) \cdot G \qquad (7)$$

When the process at Step S104c is finished, the processes at Step S105 and the subsequent steps are performed. At Step S105 and the subsequent steps, the processes at Step S105 and the subsequent steps described in the first embodiment are performed. According to the processes in FIG. 13, the positioning control device executes a positioning control, and therefore can decrease the power consumption amount during a positioning operation.

Also in the present embodiment, before performing a positioning operation in practice, the command generation unit 10 calculates the regenerative-power-amount estimated value E1 when the motor 1 operates in a reference command pattern, and selects a positioning-control command value according to a result of the comparison between this regenerative-power-amount estimated value E1 and the energy value E2 to be stored in the smoothing capacitor 23. This operation is the same as in the first embodiment, and therefore the effect of decreasing the power consumption amount during a positioning operation can be obtained.

Figure 14:
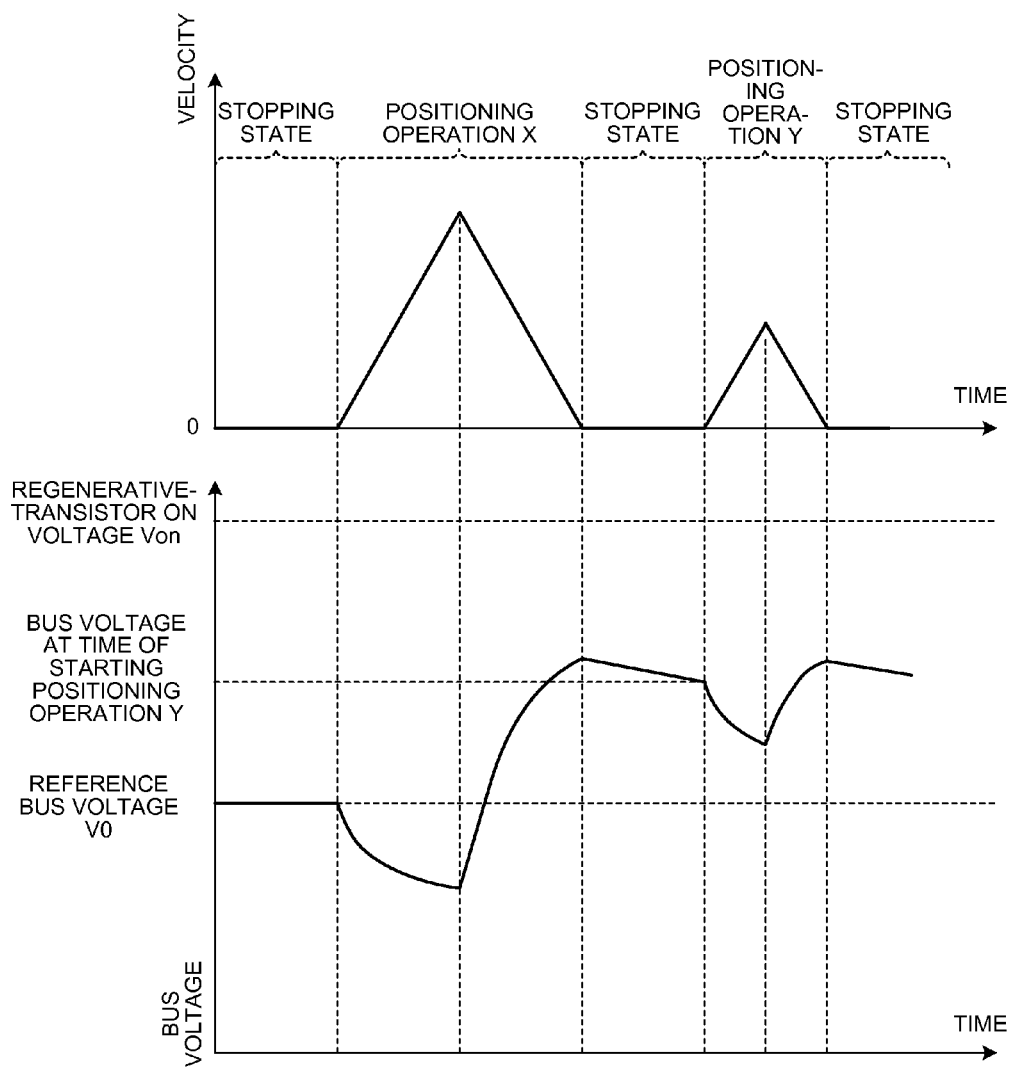
FIG. 14 is a diagram illustrating the relation between motor velocity and bus voltage during a positioning operation according to the third embodiment of the present invention that is intermittently performed a number of times.

Effects, which can be obtained not from the first or second embodiment, but from the present embodiment, are described. FIG. 14 is a diagram illustrating the relation between motor velocity and bus voltage during a positioning operation according to the third embodiment of the present invention is intermittently performed a number of times. As a specific example, FIG. 14 illustrates the relation between motor velocity and bus voltage when a positioning operation is intermittently performed twice. With reference to FIG. 14, effects of the present embodiment are described.

As described in the first and second embodiments, upon performing a positioning operation, the motor 1 consumes power during an accelerating operation and during a constant-velocity operation. Therefore, the value of bus voltage is smaller than the reference bus voltage V0. During this period, the converter unit 22 in the amplifier 7 supplies power to the inverter unit 26. On the other hand, during a decelerating operation, the motor 1 is in a regenerative state. From the start of a decelerating operation, kinetic energy of the mechanical load and the motor 1 is stored in the smoothing capacitor 23. As a result, the bus voltage increases. In a positioning control, the motor 1 reaches a certain velocity from a stopping state, and thereafter enters back into a stopping state. Therefore, the kinetic energy is 0 when the positioning starts, that is, when starting an accelerating operation, and when the positioning ends, that is, when finishing a decelerating operation. However, in a state where the bus voltage is lower than the reference bus voltage V0 during an accelerating operation, the inverter unit 26 receives a power supply from the converter unit 22. Therefore, the bus voltage when finishing a positioning operation is generally greater than a bus voltage during starting the positioning operation. In a case of intermittently performing a positioning operation, a certain positioning operation, that is, a positioning operation X in FIG. 14 is performed, then a stopping state is maintained for the time being, and thereafter another positioning operation, that is, a positioning operation Y in FIG. 14 is started. In this stopping state, in order to maintain the stopping state, it is still necessary to flow even a low current through the motor 1. When a current flows through the motor 1, power loss occurs in a winding resistance of the motor 1, in which power is consumed. Accordingly, the bus voltage gradually decreases. When the stopping state is maintained for a long time, the bus voltage decreases to the reference bus voltage V0. However, as illustrated in FIG. 14, when the stopping state is maintained for a short time, the next positioning operation is started before the bus voltage decreases to the reference bus voltage V0. Therefore, the bus voltage during starting the positioning operation Y is greater than the reference bus voltage V0. Accordingly, the difference between the regenerative-transistor ON voltage Von and the bus voltage when starting the positioning operation Y becomes smaller. Thus, when the positioning operation Y is performed, the amount of energy to be stored in the smoothing capacitor 23 is reduced as compared to when a positioning operation is started from the reference bus voltage V0.

In the flowchart in FIG. 13, at Step S110, the command generation unit 10 obtains the bus voltage Vdc immediately before the start of a positioning operation, or when starting a positioning operation. At Step S104c, the command generation unit 10 calculates an energy amount that is storable in the smoothing capacitor 23 by using the expression (6) or the expression (7). Therefore, in the case as illustrated in FIG. 14, the command generation unit 10 can calculate the energy value E2 to be stored in the smoothing capacitor 23 more accurately.

As expressed by the expression (7), the energy value E2 is multiplied by the correction coefficient G, for example, when the following is taken into account. That is, before starting a positioning operation, it is necessary to decide whether to perform a positioning operation in a reference command pattern. Therefore, as bus-voltage actual-measurement data, the bus voltage Vdc when starting a positioning operation is only obtained. However, the amount of energy to be stored in the smoothing capacitor 23 actually depends on the bus voltage when starting a decelerating operation. Therefore, due to a decrease in bus voltage caused by an accelerating operation from the time of starting a positioning operation during the time of starting a decelerating operation, the amount of energy to be stored in the smoothing capacitor 23 is increased. Accordingly, taking into account this increase, the energy value E2 is multiplied by the correction coefficient G.

This makes it possible to more accurately determine whether the regenerative power amount to be produced during a positioning operation is consumed by the regenerative resistance 24. Therefore, based on given positioning-operation specifications, it is possible to appropriately select whether to perform a positioning operation in a reference command pattern, or to perform a positioning operation in a command pattern with the minimum peak velocity, so that it becomes more advantageous to reduce the power consumption amount. Accordingly, an effect can be obtained, in which it is possible to select a command value that is more advantageous to reduce the power consumption amount during a positioning operation.

Fourth Embodiment

In the first, second, and third embodiments, reference command-pattern information is input to acquire the regenerative-power-amount estimated value E1 that is estimated when a command value for the present positioning operation is generated according to the reference command pattern. By selecting a command value on the basis of a result of the comparison between the regenerative-power-amount estimated value E1 and the energy amount E2 that is storable in the smoothing capacitor 23, the positioning control device executes a positioning control. In a fourth embodiment of the present invention, a configuration is described, in which a certain command value can be used as a reference command pattern in order to further reduce the power consumption amount during a positioning control.

Figure 15:
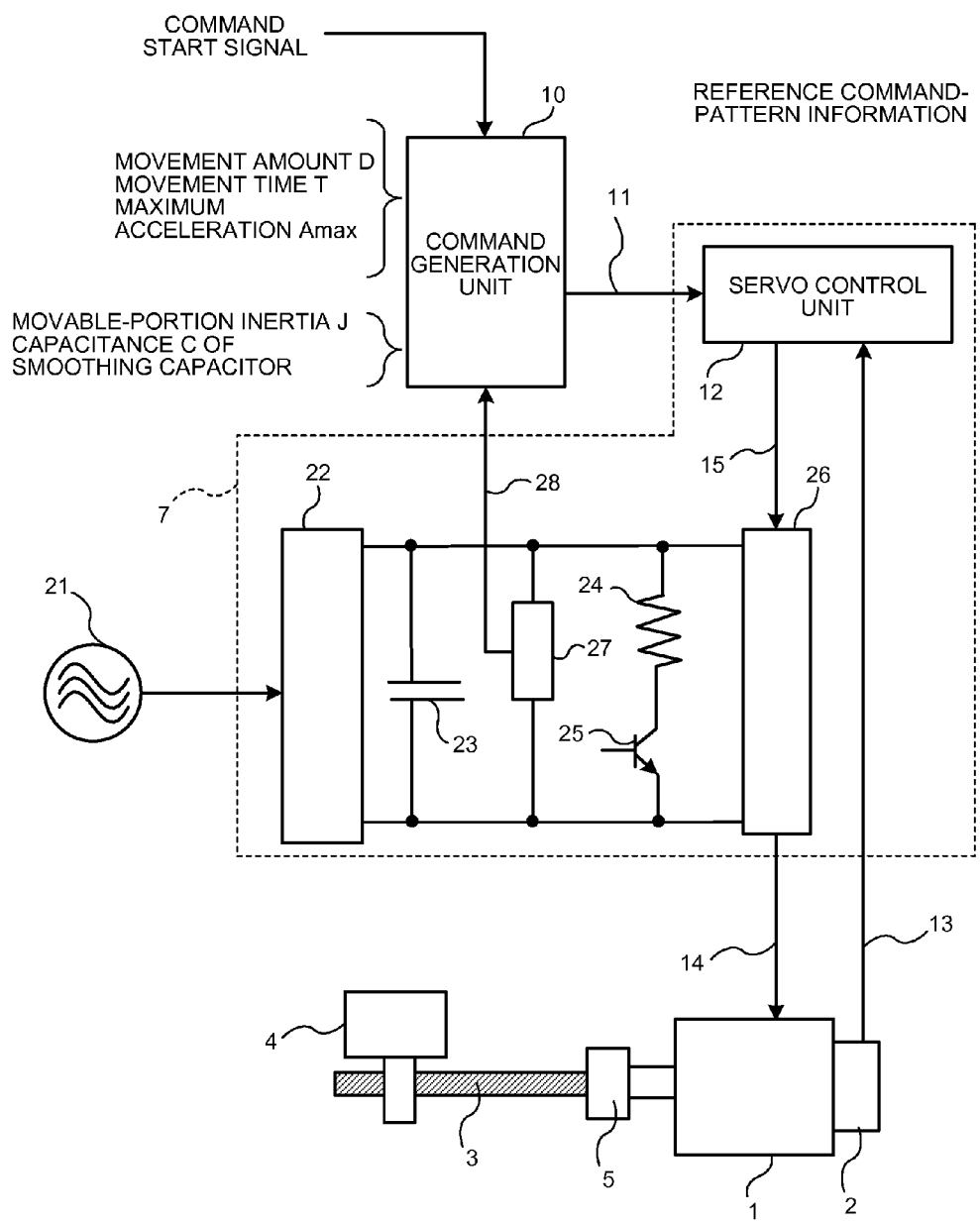
FIG. 15 is a block diagram illustrating an overall configuration of a positioning control device according to a fourth embodiment of the present invention.

FIG. 15 is a block diagram illustrating an overall configuration of a positioning control device according to the fourth embodiment of the present invention. The block diagram in FIG. 15 is partially common to the block diagram in FIG. 1. Descriptions of the portions identical to those in FIG. 1 are omitted. The block diagram in FIG. 15 is different from the block diagram in FIG. 1 in that reference command-pattern information is not input externally to the command generation unit 10, but the command generation unit 10 holds therein a preset reference command pattern described below.

Figure 16:
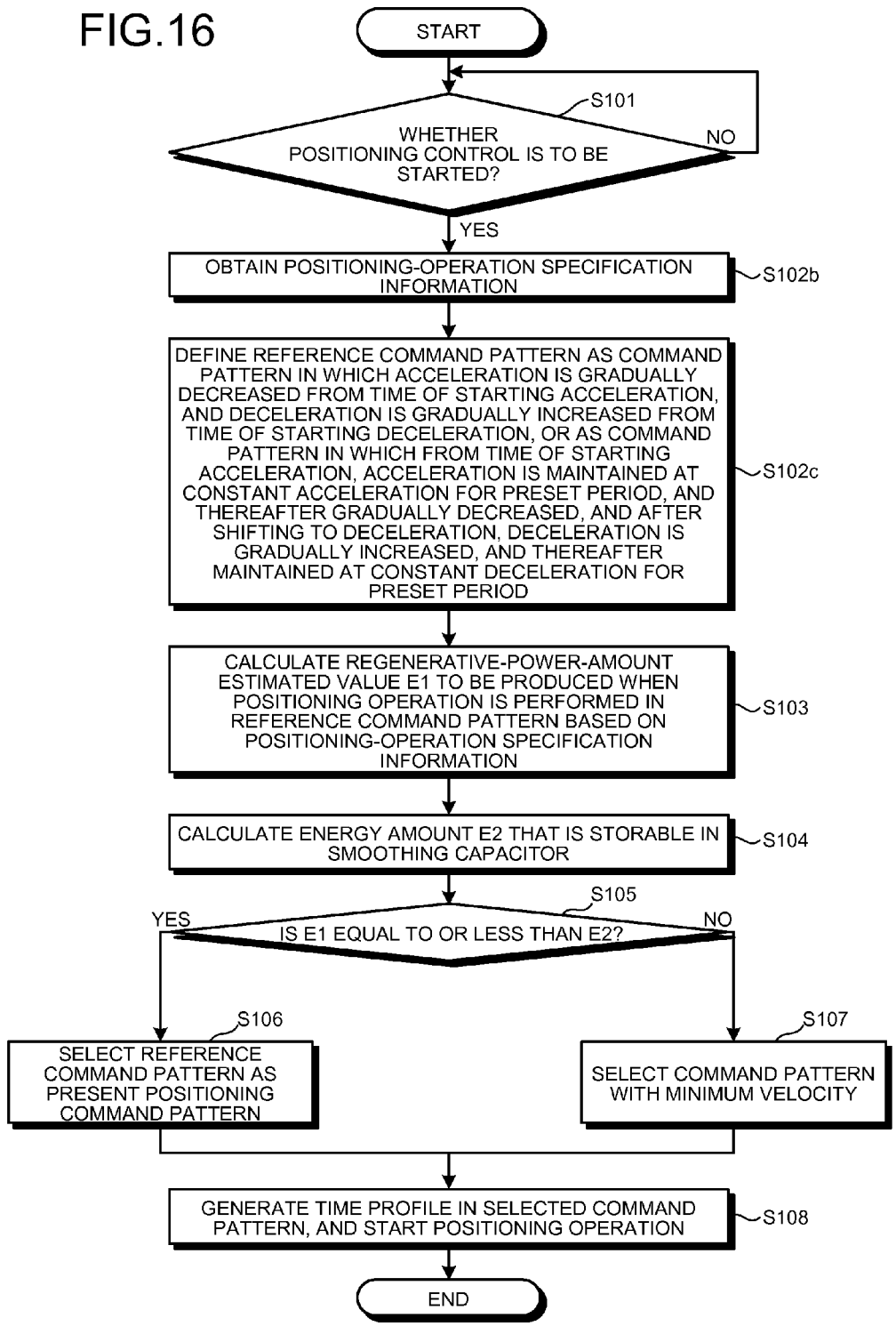
FIG. 16 is a flowchart illustrating a process procedure of a command generation unit according to the fourth embodiment of the present invention.

FIG. 16 is a flowchart illustrating a process procedure of the command generation unit 10 according to the fourth embodiment of the present invention. The flowchart in FIG. 16 is partially common to the flowchart in FIG. 2. Therefore, descriptions of the processes identical to those in FIG. 2 are omitted. The flowchart in FIG. 16 is different from the flowchart in FIG. 2 in that Step S102 in FIG. 2 is replaced with Step S102b and Step S102c.

At Step S102b, the movement amount D, the movement time T, and the maximum acceleration $A_{max}$ are input as positioning-operation specification information.

Thereafter, at Step S102c, the reference command pattern is defined as a command pattern in which the acceleration is gradually decreased from the time of starting acceleration, and the deceleration is gradually increased from the time of starting deceleration; or as a command pattern in which from the time of starting acceleration, the acceleration is maintained at the constant acceleration, which is the maximum acceleration, for a preset period, and thereafter the acceleration is gradually decreased, and after shifting to deceleration, the deceleration is gradually increased, and thereafter maintained at the constant deceleration, which is the maximum deceleration, for a preset period. The maximum deceleration is negative maximum acceleration.

Figure 17:
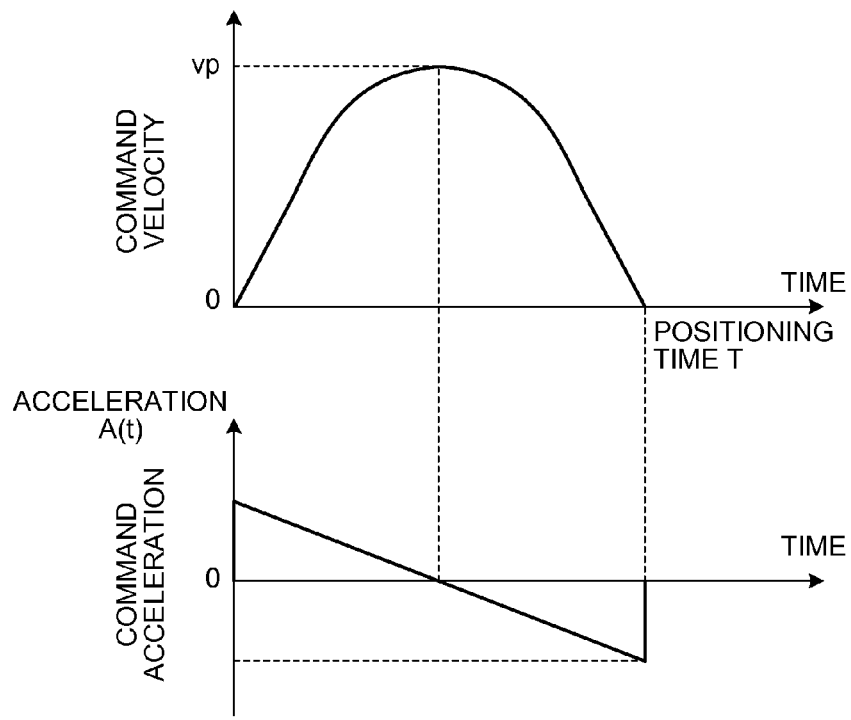
FIG. 17 is a diagram illustrating an example of a command pattern according to the fourth embodiment of the present invention in which acceleration is gradually decreased when starting acceleration and deceleration is gradually increased from when deceleration is started.

FIG. 17 illustrates a specific example of a command pattern, in which acceleration is gradually decreased from the time of starting acceleration, and deceleration is gradually increased from the time of starting deceleration. An expression for this acceleration is expressed by the following expression (8).

[Expression 8]

$$A(t) = -\frac{2A_p}{T}\left(t - \frac{T}{2}\right) \quad (0 \le t \le T) \quad (8)$$

Where $A_p$ represents the acceleration when starting an accelerating operation, and the deceleration when finishing a decelerating operation, and by using the movement amount D and the movement time T, $A_p$ is expressed as follows.

[Expression 9]

$$A_p = \frac{6D}{T^2} \quad (9)$$

The peak velocity vp upon positioning in a command pattern according to the acceleration that can be expressed by the expression (8) can be calculated as a value obtained by integrating the expression (8) with respect to the time 0 to the time T/2. Therefore, the following expression holds.

[Expression 10]

$$vp = A_p \cdot T/4 \quad (10)$$

The command pattern, in which the acceleration is gradually decreased with the start of an accelerating operation and the deceleration is increased with the start of deceleration, is not limited to the expression (8). The expression (8) shows a gradual linear decrease in the acceleration with the start of an accelerating operation, and a linear increase in the deceleration with the time of starting deceleration. However, the command pattern is not necessarily limited to a linear acceleration/deceleration pattern, and can be a pattern with a trigonometric function curve with respect to the time "t", such as a cosine (cos) curve, or a pattern with a high-order-polynomial curve with respect to the time "t".

Figure 18:
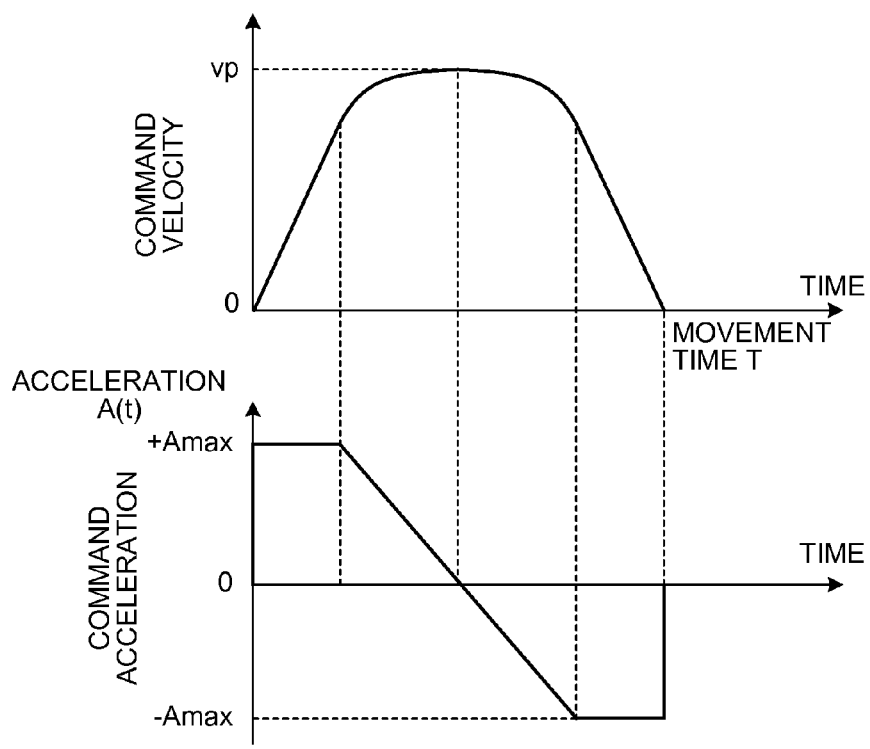
FIG. 18 is a diagram illustrating an example of a command pattern according to the fourth embodiment of the present invention in which, when starting acceleration, acceleration is maintained at a constant acceleration for a preset period; thereafter the acceleration is gradually decreased; after shifting to deceleration, deceleration is gradually increased; and thereafter maintained at constant deceleration for a preset period.

A command pattern illustrated in FIG. 18 is a specific example of the command pattern, in which from the time of starting acceleration, the acceleration is maintained at the constant acceleration, that is the maximum acceleration, for a preset period, and thereafter the acceleration is gradually decreased; and after shifting to deceleration, the deceleration is gradually increased, and thereafter maintained at the constant deceleration, that is the maximum deceleration, for a preset period. The acceleration is expressed by the following expression (11).

[Expression 11]

$$A(t) = \begin{cases} +A_{max} & (0 \le t \le T_1) \\ -\frac{2A_{max}}{T - 2T_1}(t - T_1) + A_{max} & (T_1 \le t \le T - T_1) \\ -A_{max} & (T - T_1 \le t \le T) \end{cases} \quad (11)$$

Where the following expression holds.

[Expression 12]

$$T_1 = \frac{T}{2} - \frac{\sqrt{3(T^2 - 4D/A_{max})}}{2} \quad (12)$$

The peak velocity vp upon positioning in a command pattern according to the acceleration that can be expressed by the expression (11) can be calculated as a value obtained by integrating the expression (11) with respect to the time 0 to the time T/2. Therefore, the following expression holds.

[Expression 13]

$$vp = \frac{1}{2} \cdot \left(\frac{T}{2} + T_1\right) \cdot A_{max} \qquad (13)$$

The command pattern, in which from the time of starting acceleration, the acceleration is maintained at the constant acceleration, that is the maximum acceleration, for a preset period, and thereafter the acceleration is gradually decreased, and after shifting to deceleration, the deceleration is gradually increased, and thereafter maintained at the constant deceleration, that is the maximum deceleration, for a preset period, is not limited to the expression (11). The expression (11) shows a gradual linear decrease in the acceleration, or a gradual linear decrease in the acceleration with the start of a decelerating operation, and shows a linear increase in the deceleration with the time of starting deceleration. However, the command pattern is not necessarily limited to a linear acceleration/deceleration pattern, and can be a pattern with a trigonometric function curve with respect to the time "t", such as a cosine curve, or a pattern with a high-order-polynomial curve with respect to the time "t".

At Step S103 and the subsequent steps, processes identical to those in FIG. 1 are performed. In the same manner as in the second and third embodiments, instead of Step S104, the process at Step S104b or Step S104c can be performed.

Next, effects of the present embodiment are described. In the present embodiment, identically to the first, second, and third embodiments, the regenerative power amount to be produced during the present positioning operation is estimated before the positioning start, and this estimated value E1 is compared with the energy value E2 that is storable in the smoothing capacitor 23. When the regenerative-power-amount estimated value E1 is greater than the energy value E2, a command pattern with the minimum peak velocity under given positioning conditions is selected. Therefore, an effect is obtained, which minimizes the regenerative power amount that cannot be reused, and is consumed by the regenerative resistance 24, and decreases the power consumption amount during a positioning operation.

As a reference command pattern, a typical command pattern, illustrated by the expression (8) in FIG. 17 or illustrated by the expression (11) in FIG. 18, can be used to further decrease the power consumption amount during a positioning control. In the command pattern illustrated by the expression (8) in FIG. 17, the acceleration is gradually decreased from the time of starting acceleration, and the deceleration is gradually increased from the time of starting deceleration. In the command pattern illustrated by the expression (11) in FIG. 18, from the time of starting acceleration, the acceleration is maintained at the constant acceleration, that is the maximum acceleration, for a preset period, and thereafter the acceleration is gradually decreased, and after shifting to deceleration, the deceleration is gradually increased, and thereafter is maintained at the constant deceleration, that is the maximum deceleration, for a preset period.

That is, according to the present embodiment, when the regenerative-power-amount estimated value E1 to be produced during a positioning operation is determined to be equal to or less than the energy amount E2 that is storable in the smoothing capacitor 23 at Step S105 in FIG. 16, the power consumption amount during the positioning control can further be decreased, as compared to the cases described in the first, second, and third embodiments. The reasons for this are described below.

The power consumption amount required during a positioning operation is made up of a power amount for an output of the motor 1 and a power amount for power loss. During an accelerating operation, the output of the motor 1 is converted to kinetic energy for the motor 1 and the mechanical load. Further, during a decelerating operation, this kinetic energy is converted to the regenerative power amount as described in the first, second, and third embodiments. When the regenerative power amount to be produced during a positioning operation is all stored in the smoothing capacitor 23 (YES at Step S105), the process flow shifts from Step S105 to Step S106 in FIG. 16. When the regenerative power amount to be produced during a positioning operation is all stored in the smoothing capacitor 23, this regenerative power amount can be reused upon the next positioning operation. Therefore, when the process flow shifts to Step S106, the power amount for an output of the motor 1 can be regarded as 0 as the total during a positioning operation.

Meanwhile, performing a positioning operation involves an accelerating operation and a decelerating operation. In order for the motor 1 to perform an accelerating operation and a decelerating operation, it is necessary for the motor 1 to generate torque. In order to generate torque, it is necessary to flow a current through the motor 1. When a current flows through the motor 1, power loss occurs. Therefore, when the process flow shifts to Step S106, the command pattern is configured to minimize the power loss. This makes it possible to further decrease the power consumption amount during a positioning operation.

A major factor of the power loss is copper loss caused by a current that flows through a motor winding resistance. By using a current I(t) that flows through the motor 1 during a positioning operation, the copper loss caused in the motor winding resistance during a positioning operation is expressed as follows.

[Expression 14]

$$R\int_0^T I(t)^2 dt \qquad (14)$$

Further, where a(t) represents the motor acceleration, the following expression of motion of the motor 1 and the mechanical load holds.

[Expression 15]

$$J \cdot a(t) = Kt \cdot I(t) \qquad (15)$$

(J: inertia of a movable portion of the motor and the mechanical load, a(t): motor acceleration, $K_t$: motor torque constant) Therefore, there is a proportional relation between the current and the acceleration. A command pattern, in which the mechanical load moves by a present movement amount D for a present movement time T, and the above expression (14) is minimized, is expressed by the expression (8). This command pattern has characteristics that the acceleration is gradually decreased from the time of starting acceleration, and the deceleration that is the negative acceleration is gradually increased from the time of starting deceleration. Due to this behavior, an effect of decreasing copper loss can be obtained.

Figure 19:
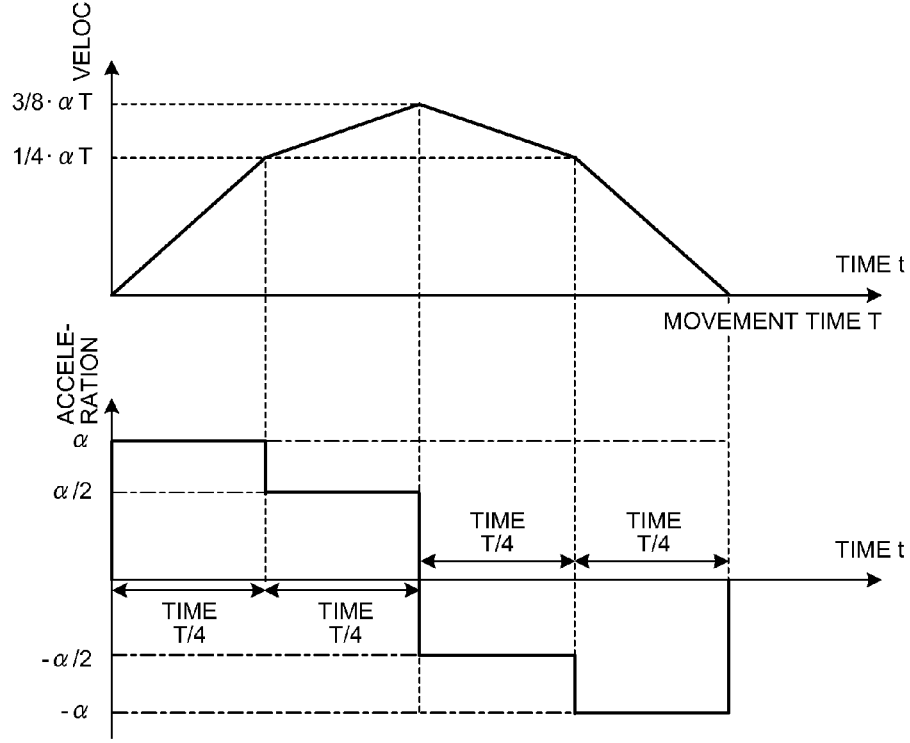
FIG. 19 is a diagram illustrating a command pattern according to the fourth embodiment of the present invention in which acceleration is gradually decreased when starting acceleration, and deceleration is gradually increased when starting deceleration.
Figure 20:
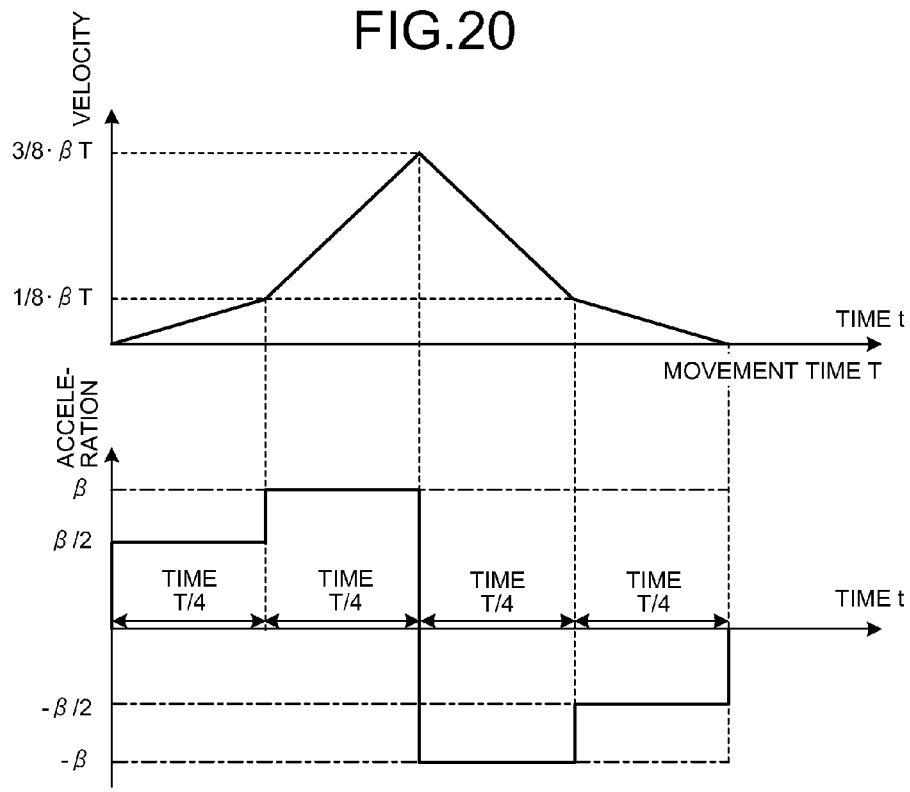
FIG. 20 is a diagram illustrating a command pattern according to the fourth embodiment of the present invention in which acceleration is gradually increased when starting acceleration, and deceleration is gradually decreased when starting deceleration.
Figure 21:
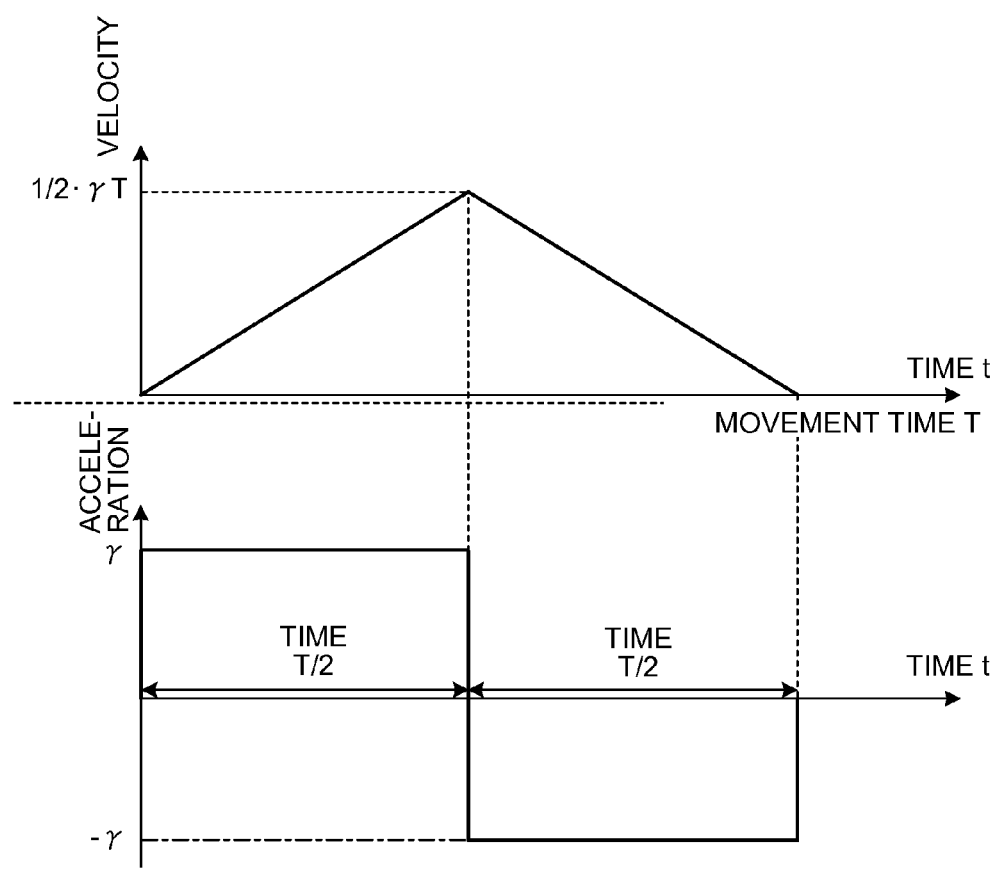
FIG. 21 is a diagram illustrating a command pattern according to the fourth embodiment of the present invention in which the acceleration is set constant during the acceleration operation and the deceleration is set constant during the decelerating operation, respectively.

This effect is described using three command patterns illustrated in FIGS. 19, 20, and 21. FIG. 19 illustrates a command pattern, in which the acceleration is α in the initial period of an accelerating operation (0≤t≤T/4), and is then decreased to α/2 in the final period of the accelerating operation (T/4<t>T/2), and the deceleration is α/2 in the initial period of a decelerating operation (T/2<t≤¾·T), and is then increased to α in the final period of the decelerating operation (¾·T<t≤T). "t" is a parameter that represents time. The movement amount in this command pattern is equal to the amount surrounded by the velocity pattern from the movement time 0 to the movement time T. Therefore, the movement amount when a positioning operation is performed according to this command pattern is $\frac{7}{32}$·α·T². In order to move the mechanical load to a desired movement amount D, the acceleration α is α=32/7·D·T². At this time, the average acceleration absolute value during the positioning time T is expressed by the following expression.

[Expression 16]

$$(\alpha \cdot T/4 + (\alpha/2) \cdot T/4 + (\alpha/2) \cdot T/4 + \alpha \cdot T/4)/T = 24/7 \cdot D/T^2 \quad (16)$$

In contrast to the command pattern in FIG. 19, FIG. 20 illustrates a command pattern, in which the acceleration is β/2 in the initial period of an accelerating operation (0≤t≤T/4), and is then increased to β in the final period of the accelerating operation (T/4<t≤T/2), and the deceleration is β in the initial period of a decelerating operation (T/2<t≤¾·1), and is then decreased to β/2 in the final period of the decelerating operation (¾·T<t≤T). In order for a movement amount to reach the desired movement amount D during a positioning operation according to this command pattern, the acceleration β is β=32/5·D/T². At this time, the average acceleration absolute value during the positioning time T is 24/5·D/T².

FIG. 21 illustrates a command pattern, in which a positioning operation is performed at constant acceleration γ and at the constant deceleration γ during an accelerating operation and a decelerating operation, respectively. In order for a movement amount to reach the desired movement amount D during a positioning operation according to this command pattern, the acceleration γ is γ=4·D/T². The average acceleration absolute value during the positioning time T is also 4·D/T².

The command patterns illustrated in FIGS. 19, 20, and 21 are all designed to perform a positioning operation by the desired movement amount D for a desired movement time T. Copper loss, caused when a positioning operation is performed according to each of the command patterns, is compared. Copper loss, caused when a positioning operation is performed according to each of the command patterns illustrated in FIGS. 19, 20, and 21, is represented as L1, L2, and L3, respectively. Based on the expression of motion, the current I(t) when a positioning operation is performed can be expressed as I(t)=J/K$_t$·A(t), where J: inertia of a mechanical load and a motor, K$_t$: motor torque constant, that is, torque generated when a unit current flows through the motor, and A(t): the acceleration in a command pattern.

At this time, a winding resistance R of the motor 1 is used to calculate L1, L2, and L3 as follows.

[Expression 17]

$$L1 = \int_0^T R \cdot I(t)^2 \, dt = \frac{128}{7} \cdot \frac{R \cdot J^2 \cdot D^2}{K_t^2 \cdot T^3} \approx 13.06 \cdot \frac{R \cdot J^2 \cdot D^2}{K_t^2 \cdot T^3} \quad (17)$$

[Expression 18]

$$L2 = \int_0^T R \cdot I(t)^2 \, dt = \frac{128}{5} \cdot \frac{R \cdot J^2 \cdot D^2}{K_t^2 \cdot T^3} \approx 25.6 \cdot \frac{R \cdot J^2 \cdot D^2}{K_t^2 \cdot T^3} \quad (18)$$

[Expression 19]

$$L3 = \int_0^T R \cdot I(t)^2 \, dt = 16 \cdot \frac{R \cdot J^2 \cdot D^2}{K_t^2 \cdot T^3} \quad (19)$$

That is, when positioning is performed by the identical movement amount D for the identical movement time T, the most effective command pattern in decreasing copper loss is the command pattern as illustrated in FIG. 19, in which during an accelerating operation, the acceleration is decreased with the elapsed time, and during a decelerating operation, the deceleration is increased with the elapsed time. These properties are not only observed in the command pattern in FIG. 19, but are also observed in common with command patterns in which during an accelerating operation, the acceleration is gradually decreased, and during a decelerating operation, the deceleration is gradually increased. When a mechanical load moves by the identical movement amount D for the identical movement time T, greater acceleration is employed in the initial period of an accelerating operation, and therefore a higher velocity can be obtained immediately after the start of a positioning operation. Also, greater deceleration is employed in the final period of a decelerating operation, and therefore a relatively higher velocity can be obtained until immediately before the stop of deceleration when the velocity reaches 0. Due to this velocity pattern, during the positioning time, only a low velocity is enough to perform positioning by a certain movement amount for a certain movement time. The acceleration is the rate of change in velocity, that is, a differential of velocity. Therefore, when the velocity is low, even though the average absolute value of the acceleration that is the rate of change in this velocity is made smaller during the movement time, the mechanical load can still move by the preset movement amount D for the preset movement time T. In practice, among the command pattern examples illustrated in FIGS. 19, 20, and 21, the average acceleration is lowest in the command pattern illustrated in FIG. 19. There is a proportional relation between the motor acceleration and the motor current. Therefore, by using the command pattern as described above, the average current during the positioning time is also made lower. This results in an effect of decreasing copper loss during a positioning control.

There is a case where when the command pattern as typically illustrated by the expression (8) is used, in which the acceleration is gradually decreased from the time of starting acceleration, and the deceleration is gradually increased from the time of starting deceleration, the acceleration during a positioning operation may exceed the maximum acceleration A$_{max}$. In that case, the command pattern as illustrated by the expression (11) is used, in which during starting acceleration, the acceleration is maintained at the maximum acceleration for a certain time, and thereafter decreased gradually, and from the time of starting deceleration, the deceleration is gradually increased, and thereafter is maintained at the maximum deceleration for a certain time. In the command pattern as described above, when a mechanical load moves for the identical movement time T, greater acceleration is employed in the initial period of an accelerating operation, and therefore a higher velocity can be obtained immediately after the positioning start. Also, the greater deceleration is employed in the final period of a decelerating operation, and therefore a relatively higher velocity can be obtained until immediately before the stop of deceleration when the velocity reaches 0. This can be achieved while the maximum value of the acceleration is made equal to or less than the maximum acceleration $A_{max}$.

In the first to fourth embodiments described above, an exemplary case has been described, in which a rotary motor is used as the motor 1, and the ball screw 3 converts rotational motion to transitional motion to control positioning of the mechanical load. However, the present invention can also be applied to the case where a motor such as a linear motor that generates power in a linear direction is used to control positioning of a mechanical load.

In FIGS. 1, 8, 12, and 15, the example has been described, in which a single smoothing capacitor 23 is only provided in the positioning control device. However, a plural number of smoothing capacitors can be provided in parallel between bus-bars. In this case, a combined calculation value of the capacitance of the smoothing capacitors can be calculated as a capacitance of the smoothing capacitor 23. For example, when two smoothing capacitors, one of which has a capacitance C1 and the other has a capacitance C2, are connected in parallel between bus-bars, the capacitance of the smoothing capacitor 23 is calculated as C=(C1+C2), and therefore the above first to fourth embodiments can also be implemented.

Furthermore, the invention of the present application is not limited to the above embodiments, and when the present invention is carried out, the invention can be variously modified without departing from the scope thereof. In the above embodiments, inventions of various stages are included, and various inventions can be extracted by appropriately combining a plurality of constituent elements disclosed herein. For example, even when some constituent elements are removed from all the constituent elements described in the embodiments, as far as the problems mentioned in the section of Solution to Problem can be solved and effects mentioned in the section of Advantageous Effects of Invention are obtained, the configuration from which some constituent elements have been removed can be extracted as an invention. In addition, constituent elements mentioned in different embodiments can be appropriately combined.

INDUSTRIAL APPLICABILITY

As described above, the positioning control device according to the present invention is useful to reduce the power consumption amount when controlling the positioning of a mechanical load using a motor, and is suitable particularly for a positioning control device that includes an amplifier provided with a smoothing capacitor.

REFERENCE SIGNS LIST 1 motor, 2 encoder, 3 ball screw, 4 positioning head, 5 coupling, 7 amplifier, 10 command generation unit, 13 detected information, 14 current, 15 voltage command, 21 AC power supply, 22 converter unit, 23 smoothing capacitor, 24 regenerative resistance, 25 regenerative transistor, 26 inverter unit, 27 bus-voltage detecting circuit, 28 detected bus-voltage value 28 (Vdc).

The invention claimed is:

1. A positioning control device comprising:
an amplifier that includes
a converter to rectify and to output an AC power supply to bus-bars,
a smoothing capacitor to smooth an output of the converter and to generate a bus voltage,
a regenerative resistance and a regenerative transistor that are connected between the bus-bars, and an inverter to supply a drive current for driving a motor; and
a command generation unit to generate a position command value for a positioning control of a mechanical load connected to the motor, the position command value being generated on the basis of a command pattern that is pattern information of a command velocity and command acceleration, wherein
the inverter is connected between the bus-bars, and supplies the drive current on the basis of the position command value, and
the command generation unit
acquires a regenerative-power-amount estimated value that is estimated from the command pattern before a start of a positioning operation and acquires an energy value that is storable in the smoothing capacitor,
when the regenerative-power-amount estimated value is greater than the energy value, uses the position command value, by which a peak velocity of the motor is minimized under a condition that an upper-limit value is given to an absolute value of acceleration, in the positioning operation, and
when the regenerative-power-amount estimated value is equal to or smaller than the energy value, uses the position command value that is on the basis of the command pattern in the positioning operation, uses the position command value that is on the basis of the command pattern in the positioning operation.

2. The positioning control device according to claim 1, wherein
the amplifier includes a servo control unit that outputs a command signal on the basis of the position command value and a position of the motor, and
the inverter supplies the drive current on the basis of the command signal.

3. The positioning control device according to claim 1, wherein
the command generation unit uses inertia J of a movable portion of the mechanical load and the motor and a peak velocity vp that is on the basis of the command pattern so as to acquire the regenerative-power-amount estimated value from $$\frac{1}{2} \cdot J \cdot vp^2. \qquad \text{[Expression 1]}$$

4. The positioning control device according to claim 1, wherein
the command generation unit uses a capacitance C of the smoothing capacitor, a voltage value Von at which the regenerative transistor turns ON, and a reference bus voltage V0 that indicates a value of the steady bus voltage that is output from the converter so as to acquire the energy value from $$\frac{1}{2} \cdot C \cdot Von^2 - \frac{1}{2} \cdot C \cdot V0^2. \qquad \text{[Expression 2]}$$

5. The positioning control device according to claim 1, wherein
the command generation unit uses a capacitance C of the smoothing capacitor, a voltage value Von at which the regenerative transistor turns ON, a reference bus voltage V0 that indicates a value of the steady bus voltage that is output from the converter, and a constant G that is greater than 1 so as to acquire the energy value from $$G \cdot (\tfrac{1}{2} \cdot C \cdot Von^2 - \tfrac{1}{2} \cdot C \cdot V0^2) \qquad \text{[Expression 3]}$$

6. The positioning control device according to claim 1, wherein
the command generation unit uses a capacitance C of the smoothing capacitor, a voltage value Von at which the regenerative transistor turns ON, and a bus voltage Vdc at a time when the positioning operation starts so as to acquire the energy value from $$\tfrac{1}{2} \cdot C \cdot Von^2 - \tfrac{1}{2} \cdot C \cdot Vdc^2. \qquad \text{[Expression 4]}$$

7. The positioning control device according to claim 1, wherein
the command generation unit uses a capacitance C of the smoothing capacitor, a voltage value Von at which the regenerative transistor turns ON, a bus voltage Vdc at a time when the positioning operation starts, and a constant G that is greater than 1 so as to acquire the energy value from $$G \cdot (\tfrac{1}{2} \cdot C \cdot Von^2 - \tfrac{1}{2} \cdot C \cdot Vdc^2) \qquad \text{[Expression 5]}$$

8. The positioning control device according to claim 1, wherein
a pattern of the command acceleration is a pattern in which acceleration is gradually decreased from a time when acceleration starts, and deceleration is gradually increased from a time when deceleration starts.

9. The positioning control device according to claim 1, wherein
a pattern of the command acceleration is a pattern in which from a time when acceleration stars, acceleration is maintained at constant acceleration for a preset period; thereafter gradually decreased; after shifting to decelerate, deceleration is gradually increased; and thereafter maintained at constant deceleration for a preset period.

10. The positioning control device according to claim 1, wherein
the smoothing capacitor is configured from a plurality of capacitors, the capacitors being connected in parallel between the bus-bars.

* * * * *